US012628011B2

(12) United States Patent
Jang et al.

(10) Patent No.: US 12,628,011 B2
(45) Date of Patent: May 12, 2026

(54) METHOD AND DEVICE FOR NOTIFYING OF BEAM FAILURE RECOVERY IN WIRELESS COMMUNICATION SYSTEM

(71) Applicant: Samsung Electronics Co., Ltd., Suwon-si (KR)

(72) Inventors: Jaehyuk Jang, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 513 days.

(21) Appl. No.: 17/907,842

(22) PCT Filed: Mar. 19, 2021

(86) PCT No.: PCT/KR2021/003417
§ 371 (c)(1),
(2) Date: Aug. 29, 2022

(87) PCT Pub. No.: WO2021/187938
PCT Pub. Date: Sep. 23, 2021

(65) Prior Publication Data
US 2023/0131368 A1    Apr. 27, 2023

(30) Foreign Application Priority Data
Mar. 20, 2020    (KR) ........................ 10-2020-0034671

(51) Int. Cl.
*H04W 24/08*      (2009.01)
*H04B 7/06*       (2006.01)
(Continued)

(52) U.S. Cl.
CPC ........ *H04W 24/08* (2013.01); *H04B 7/06964* (2023.05); *H04W 74/0833* (2013.01); *H04W 74/0836* (2024.01); *H04W 74/0838* (2024.01)

(58) Field of Classification Search
CPC .............. H04W 24/08; H04W 74/0833; H04B 7/06964
(Continued)

(56) References Cited

U.S. PATENT DOCUMENTS 10,674,383 B2    6/2020  Yu et al.
10,721,767 B2    7/2020  Kim et al.
(Continued)

FOREIGN PATENT DOCUMENTS

CN         109997397 A    7/2019
CN         110012499 A    7/2019
(Continued)

OTHER PUBLICATIONS

Qualcomm Inc., Remaining issues in SCell BFR, R2-2001484, 3GPP TSG-RAN WG2 Meeting #109 electronic, Feb. 14, 2020, Elbonia.
(Continued)

*Primary Examiner* — Faisal Choudhury
(74) *Attorney, Agent, or Firm* — Jefferson IP Law, LLP

(57)             ABSTRACT
The disclosure provides a method, performed by a user equipment (UE), of performing beam failure detection and recovery, the method including: receiving, from a base station (BS), configuration information about beam failure detection and recovery; detecting a beam failure with respect to a special cell (SpCell) or a secondary cell (Scell), based on the configuration information; and transmitting, based on a result of the detecting, a beam failure recovery (BFR) medium access control (MAC) control element (CE) (BFR MAC CE) via a random access procedure or on an uplink (UL) resource or a scheduling request (SR) resource which is for transmission of the BFR MAC CE, wherein the BFR MAC CE includes information about detection or non-detection of a beam failure with respect to the SpCell.

21 Claims, 10 Drawing Sheets

(51) Int. Cl.
  *H04W 74/08* (2024.01)
  *H04W 74/0833* (2024.01)
  *H04W 74/0836* (2024.01)
  *H04W 74/0838* (2024.01)

(58) Field of Classification Search
  USPC .......................................................... 370/216
  See application file for complete search history.

(56) References Cited

U.S. PATENT DOCUMENTS

| | | | |
|---|---|---|---|
| 10,757,587 B2 | 8/2020 | Hong | |
| 2019/0274098 A1 | 9/2019 | Cheng et al. | |
| 2019/0313461 A1 | 10/2019 | Jung et al. | |
| 2019/0327769 A1 | 10/2019 | Yang et al. | |
| 2020/0177266 A1* | 6/2020 | Kang | H04W 74/0833 |
| 2020/0322035 A1* | 10/2020 | Shi | H04W 74/0833 |
| 2021/0050901 A1* | 2/2021 | Chin | H04L 1/1614 |
| 2021/0051651 A1* | 2/2021 | He | H04W 72/21 |
| 2021/0068162 A1 | 3/2021 | Agiwal et al. | |
| 2021/0105058 A1* | 4/2021 | Lin | H04W 72/1263 |
| 2021/0105827 A1* | 4/2021 | Tsai | H04W 76/28 |
| 2021/0266810 A1* | 8/2021 | Koskela | H04B 7/06964 |
| 2021/0409091 A1* | 12/2021 | Svedman | H04W 72/23 |
| 2022/0061087 A1* | 2/2022 | Koskela | H04W 16/28 |
| 2022/0294520 A1* | 9/2022 | Tran | H04B 7/088 |
| 2022/0394583 A1* | 12/2022 | Deenoo | H04W 36/305 |
| 2024/0113763 A1* | 4/2024 | Yang | H04L 5/001 |

FOREIGN PATENT DOCUMENTS

| | | |
|---|---|---|
| EP | 3 609 285 A1 | 2/2020 |
| KR | 10-2019-0085416 A | 7/2019 |
| KR | 10-2021-0039727 A | 4/2021 |
| WO | 2019/135654 A1 | 7/2019 |
| WO | 2021-230544 A1 | 11/2021 |

OTHER PUBLICATIONS

Ericsson et al., BFR MAC CE for SpCell, R2-2001652, 3GPP TSG-RAN WG2 #109 electronic, Feb. 14, 2020.

Zte et al., The remaining issues on Beam Failure Recovery on SpCell and SCell, R2-2001464, 3GPP TSG-RAN WG2 Meeting #109 electronic, Feb. 14, 2020.

International Search Report dated Jul. 5, 2021, issued in International Application No. PCT/KR2021/003417.

Samsung: MAC Running CR for NR eMIMO, 3GPP Draft; R2-2001706, 3rd Generation Partnership Project (3GPP), vol. RAN WG2, No. XP051864462; Mar. 11, 2020, Elbonia.

Extended European Search Report dated Jun. 22, 2023, issued in European Patent Application No. 21770671.2.

Chinese Office Action dated Mar. 28, 2025, issued in Chinese Patent Application No. 202180022408.7.

European Office Action dated Apr. 11, 2025, issued in European Patent Application No. 21770671.2.

Samsung, Offline Discussion 112: Beam Management Enhancements, R2-200xxxx, 3GPP TSG-RAN WG2 Meeting#109e, Feb. 29, 2020.

Chinese Office Action dated Aug. 22, 2025, issued in Chinese Patent Application No. 202180022408.7.

Korean Office Action dated Sep. 18, 2025, issued in Korean Patent Application No. 10-2020-0034671.

Chinese Notice of Allowance dated Feb. 4, 2026, issued in Chinese Patent Application No. 202180022408.7.

\* cited by examiner

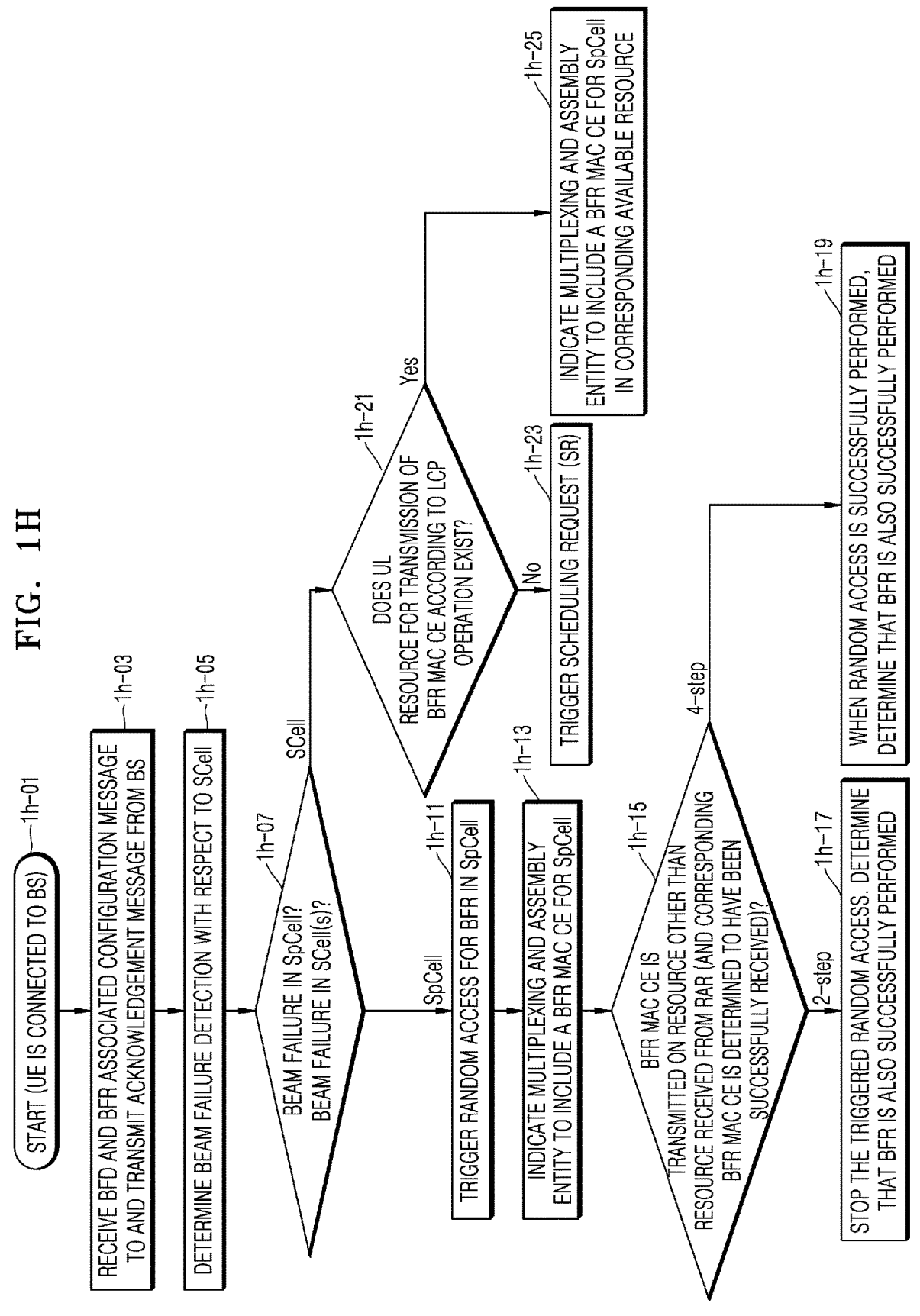

START (UE IS CONNECTED TO BS) 1h-01

RECEIVE BFD AND BFR ASSOCIATED CONFIGURATION MESSAGE TO AND TRANSMIT ACKNOWLEDGEMENT MESSAGE FROM BS 1h-03

DETERMINE BEAM FAILURE DETECTION WITH RESPECT TO SCell 1h-05

BEAM FAILURE IN SpCell? BEAM FAILURE IN SCell(s)? 1h-07

SpCell

SCell

TRIGGER RANDOM ACCESS FOR BFR IN SpCell 1h-11

INDICATE MULTIPLEXING AND ASSEMBLY ENTITY TO INCLUDE A BFR MAC CE FOR SpCell 1h-13

BFR MAC CE IS TRANSMITTED ON RESOURCE OTHER THAN RESOURCE RECEIVED FROM RAR (AND CORRESPONDING BFR MAC CE IS DETERMINED TO HAVE BEEN SUCCESSFULLY RECEIVED)? 1h-15

4-step 2-step

STOP THE TRIGGERED RANDOM ACCESS. DETERMINE THAT BFR IS ALSO SUCCESSFULLY PERFORMED 1h-17

DOES UL RESOURCE FOR TRANSMISSION OF BFR MAC CE ACCORDING TO LCP OPERATION EXIST? 1h-21

Yes

No

INDICATE MULTIPLEXING AND ASSEMBLY ENTITY TO INCLUDE A BFR MAC CE FOR SpCell IN CORRESPONDING AVAILABLE RESOURCE 1h-25

TRIGGER SCHEDULING REQUEST (SR) 1h-23

WHEN RANDOM ACCESS IS SUCCESSFULLY PERFORMED, DETERMINE THAT BFR IS ALSO SUCCESSFULLY PERFORMED 1h-19

METHOD AND DEVICE FOR NOTIFYING OF BEAM FAILURE RECOVERY IN WIRELESS COMMUNICATION SYSTEM

TECHNICAL FIELD

The disclosure relates to a method of indicating a beam failure recovery with respect to a special cell (SpCell) in a wireless communication system.

BACKGROUND ART

In order to meet increasing demand with respect wireless data traffic after the commercialization of 4th generation (4G) communication systems, efforts have been made to develop 5th generation (5G) or pre-5G communication systems. For this reason, 5G or pre-5G communication systems are called 'beyond 4G network' communication systems or 'post long term evolution (post-LTE)' systems. In order to achieve high data rates, implementation of 5G communication systems in an ultra-high frequency millimeter-wave (mmWave) band (e.g., a 60-gigahertz (GHz) band) is being considered. In order to reduce path loss of radio waves and increase a transmission distance of radio waves in the ultra-high frequency band for 5G communication systems, various technologies such as beamforming, massive multiple-input and multiple-output (massive MIMO), full-dimension MIMO (FD-MIMO), array antennas, analog beamforming, and large-scale antennas are being studied. In order to improve system networks for 5G communication systems, various technologies such as evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation have been developed. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA) have been developed.

The Internet has evolved from a human-based connection network, where humans create and consume information, to the Internet of things (IoT), where distributed elements such as objects exchange information with each other to process the information. Internet of everything (IoE) technology has emerged, in which the IoT technology is combined with, for example, technology for processing big data through connection with a cloud server. In order to implement the IoT, various technological elements such as sensing technology, wired/wireless communication and network infrastructures, service interface technology, and security technology are required, such that, in recent years, technologies related to sensor networks for connecting objects, machine-to-machine (M2M) communication, and machine-type communication (MTC) have been studied. In the IoT environment, intelligent Internet technology (IT) services may be provided to collect and analyze data obtained from connected objects to create new value in human life. As existing information technology (IT) and various industries converge and combine with each other, the IoT may be applied to various fields such as smart homes, smart buildings, smart cities, smart cars or connected cars, smart grids, health care, smart home appliances, and advanced medical services.

Accordingly, various attempts are being made to apply 5G communication systems to the IoT network. For example, technologies related to sensor networks, M2M communication, and MTC are being implemented by using 5G communication technology using beamforming, MIMO, and array antennas. Application of cloud radio access network (Cloud-RAN) as the above-described big data processing technology may be an example of convergence of 5G communication technology and IoT technology.

In particular, according to the development of wireless communication systems, there is a demand for a method of efficiently indicating a beam failure recovery with respect to a special cell (SpCell).

DESCRIPTION OF EMBODIMENTS

Technical Problem

The disclosure provides a method of indicating a beam failure recovery with respect to a cell.

Solution to Problem

According to embodiments of the disclosure, provided are an apparatus and method for efficiently providing a service in a wireless communication system.

Advantageous Effects of Disclosure

According to embodiments of the disclosure, provided are an apparatus and method for efficiently providing a service in a wireless communication system.

BRIEF DESCRIPTION OF DRAWINGS

FIG. 1E is a diagram illustrating an example of downlink (DL) and uplink (UL) channel frame structures when communication is performed based on a beam in an NR system according to an embodiment of the disclosure.

FIG. 1H is a diagram of a second example of UE operations when a UE performs beam failure detection and recovery with respect to a SpCell according to an embodiment of the disclosure.

BEST MODE

Figure 1A:
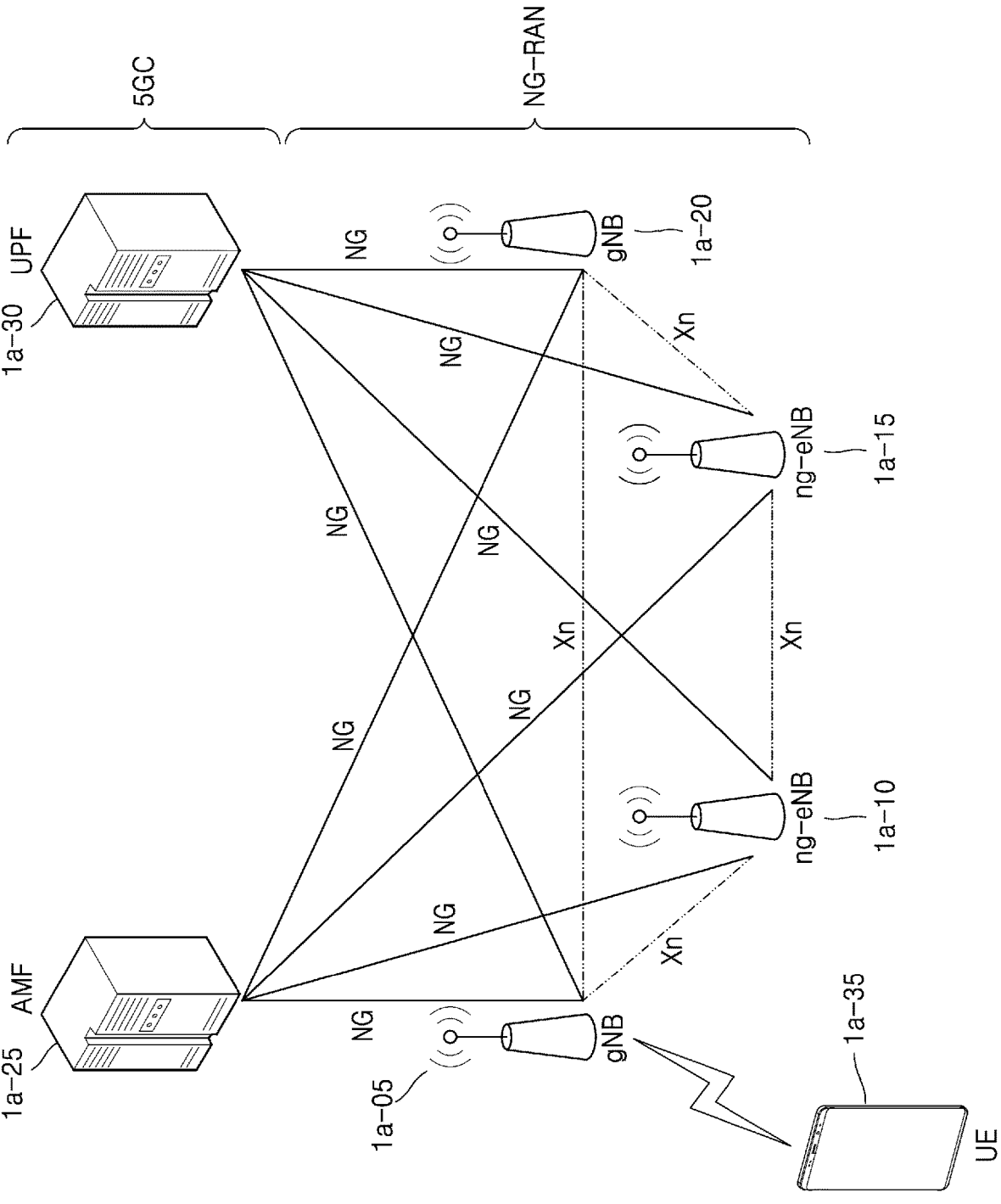
FIG. 1A is a diagram illustrating a structure of a new radio (NR) system according to an embodiment of the disclosure.

According to an embodiment of the disclosure, the method, performed by a user equipment (UE), of performing beam failure detection and recovery may include: receiving, from a base station (BS), configuration information about beam failure detection and recovery; detecting a beam failure with respect to a special cell (SpCell) or a secondary cell (Scell), based on the configuration information; and transmitting, based on a result of the detecting, a beam failure recovery (BFR) medium access control (MAC) control element (CE) (BFR MAC CE) via a random access procedure or on an uplink (UL) resource or a scheduling request (SR) resource which is for transmission of the BFR MAC CE, wherein the BFR MAC CE includes information about detection or non-detection of a beam failure with respect to the SpCell.

The transmitting of the BFR MAC CE may include: when a beam failure with respect to the SCell is detected, determining whether a UL resource for transmission of the BFR MAC CE exists; and when the UL resource exists, transmitting the BFR MAC CE on the UL resource, and when the UL resource does not exist, transmitting the BFR MAC CE on the SR resource for transmission of the BFR MAC CE or via the random access procedure.

The transmitting of the BFR MAC CE on the UL resource may further include indicating a multiplexing and assembly entity to generate the BFR MAC CE.

The transmitting of the BFR MAC CE may include: when a beam failure with respect to the SpCell is detected, triggering the random access procedure; and transmitting the BFR MAC CE via the random access procedure.

The transmitting of the BFR MAC CE via the random access procedure may include, when the random access procedure is a 2-step random access procedure, indicating a multiplexing and assembly entity to include the BFR MAC CE in message A (MSG A), and transmitting the BFR MAC CE via the MSG A.

The transmitting of the BFR MAC CE via the random access procedure may include, when the random access procedure is a 4-step random access procedure, indicating a multiplexing and assembly entity to include the BFR MAC CE in Msg 3, and transmitting the BFR MAC CE via the Msg 3.

The BFR MAC CE may further include one or more serving cell identifiers and detailed information of serving cells respectively corresponding to the one or more serving cell identifiers.

The detailed information of the serving cells may include an available candidate (AC) field, and the AC field of the detailed information of the serving cells may indicate whether information about a beam available for an additional beam recovery is included in the detailed information of the serving cells.

A first identifier of the one or more serving cell identifiers may indicate the information about detection or non-detection of the beam failure with respect to the SpCell.

When the first identifier indicates detection of the beam failure with respect to the SpCell, the BFR MAC CE may not include the detailed information of the serving cells.

According to an embodiment of the disclosure, a user equipment (UE) for performing beam failure detection and recovery may include: a transceiver; and a processor coupled with the transceiver and configured to receive, from a base station (BS), configuration information about beam failure detection and recovery, detect a beam failure with respect to a special cell (SpCell) or a secondary cell (Scell), based on the configuration information, and transmit, based on a result of the detecting, a beam failure recovery (BFR) medium access control (MAC) control element (CE) (BFR MAC CE) via a random access procedure or on an uplink (UL) resource or a scheduling request (SR) resource which is for transmission of the BFR MAC CE, wherein the BFR MAC CE includes information about detection or non-detection of a beam failure with respect to the SpCell.

The processor may be further configured to, when a beam failure with respect to the SpCell is detected, trigger the random access procedure, and transmit the BFR MAC CE via the random access procedure.

The processor may be further configured to, when the random access procedure is a 2-step random access procedure, indicate a multiplexing and assembly entity to include the BFR MAC CE in MSG A, and transmit the BFR MAC CE via the MSG A, and when the random access procedure is a 4-step random access procedure, indicate a multiplexing and assembly entity to include the BFR MAC CE in Msg 3, and transmit the BFR MAC CE via the Msg 3.

The BFR MAC CE may further include one or more serving cell identifiers and detailed information of serving cells respectively corresponding to the one or more serving cell identifiers.

A first identifier of the one or more serving cell identifiers may indicate the information about detection or non-detection of the beam failure with respect to the SpCell, and when the first identifier indicates detection of the beam failure with respect to the SpCell, the BFR MAC CE may not include the detailed information of the serving cells.

MODE OF DISCLOSURE

Hereinafter, operational principles of the disclosure will be described in detail with reference to accompanying drawings. In the following descriptions of the disclosure, well-known functions or configurations are not described in detail because they would obscure the disclosure with unnecessary details. The terms used in the specification are defined in consideration of functions used in the disclosure, and may be changed according to the intent or known methods of operators and users. Accordingly, definitions of the terms should be understood based on the entire description of the present specification.

Hereinafter, terms identifying an access node, terms indicating network entities or network functions (NFs), terms indicating messages, terms indicating an interface between network entities, and terms indicating various pieces of identification information, as used in the following description, are exemplified for convenience of descriptions. Accordingly, the disclosure is not limited to terms to be described below, and other terms indicating objects having equal technical meanings may be used.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein. Rather, these embodiments are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements.

It will be understood that each block of flowchart illustrations, and combinations of blocks in the flowchart illustrations, may be implemented by computer program instructions. The computer program instructions may be provided to a processor of a general-purpose computer, special purpose computer, or other programmable data processing apparatus, such that the instructions, which are executed via the processor of the computer or other programmable data processing apparatus, generate means for performing functions specified in the flowchart block(s). The computer program instructions may also be stored in a computer-executable or computer-readable memory that may direct the computer or other programmable data processing apparatus to function in a particular manner, such that the instructions stored in the computer-executable or computer-readable memory may produce an article of manufacture including instruction means that perform the functions specified in the flowchart block(s). The computer program instructions may also be loaded onto the computer or other programmable data processing apparatus to cause a series of operational steps to be performed on the computer or other programmable apparatus to produce a computer implemented process such that the instructions that are executed on the computer or other programmable apparatus provide operations for implementing the functions specified in the flowchart block(s).

In addition, each block of the flowchart illustrations may represent a module, segment, or portion of code, which includes one or more executable instructions for performing specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term " . . . unit" as used in the present embodiment refers to a software or hardware component, such as field-programmable gate array (FPGA) or application-specific integrated circuit (ASIC), which performs certain tasks. However, the term " . . . unit" does not mean to be limited to software or hardware. A " . . . unit" may be configured to be in an addressable storage medium or configured to operate one or more processors. Thus, according to an embodiment, a " . . . unit" may include, by way of example, components, such as software components, object-oriented software components, class components, and task components, processes, functions, attributes, procedures, subroutines, segments of program code, drivers, firmware, microcode, circuitry, data, databases, data structures, tables, arrays, and variables. The functionality provided in the elements and " . . . units" may be combined into fewer elements and " . . . units" or further separated into additional elements and " . . . units". Further, the elements and " . . . units" may be implemented to operate one or more central processing units (CPUs) in a device or a secure multimedia card. Also, according to an embodiment, a " . . . unit" may include one or more processors.

In the description of the disclosure, detailed descriptions of the related art are omitted when it is deemed that they may unnecessarily obscure the essence of the disclosure. Hereinafter, embodiments of the disclosure will now be described with reference to the accompanying drawings.

Hereinafter, terms identifying an access node, terms indicating network entities or network functions (NFs), terms indicating messages, terms indicating an interface between network entities, and terms indicating various pieces of identification information, as used in the following description, are exemplified for convenience of descriptions. Accordingly, the disclosure is not limited to terms to be described below, and other terms indicating objects having equal technical meanings may be used. For example, in the descriptions below, a user equipment (UE) may refer to a medium access control (MAC) entity in a UE existing in each of master cell group (MCG) and secondary cell group (SCG) to be described below.

Hereinafter, for convenience of descriptions, some terms and names defined in the $3^{rd}$ Generation Partnership Project Long Term Evolution (3GPP LTE) standard may be used. However, the disclosure is not limited to these terms and names, and may be equally applied to systems conforming to other standards.

Hereinafter, a base station is an entity that allocates resources to a terminal, and may be at least one of a next-generation node B (gNode B), an evolved node B (eNode B), a Node B, a base station (BS), a radio access unit, a BS controller, or a node on a network. A terminal may include a UE, a mobile station (MS), a cellular phone, a smartphone, a computer, or a multimedia system capable of performing a communication function. However, the disclosure is not limited to the above example.

In particular, the disclosure may be applied to the 3GPP new radio (NR) (5th generation (5G) mobile communication standard). Also, the disclosure may be applied to intelligent services (e.g., smart home, smart building, smart city, smart car or connected car, health care, digital education, retail, security, and safety services) based on 5G communication technology and Internet of Things (IoT) technology. In the disclosure, an eNB may be interchangeably used with a gNB for convenience of descriptions. That is, a BS described by an eNB may represent a gNB. Also, the term "terminals (UEs)" may refer to not only mobile phones, NB-IoT devices, and sensors but also refer to other wireless communication devices.

Wireless communication systems providing voice-based services in early stages are being developed to broadband wireless communication systems providing high-speed and high-quality packet data services according to communication standards such as high speed packet access (HSPA), long term evolution (LTE) or evolved universal terrestrial radio access (E-UTRA), LTE-advanced (LTE-A), LTE-Pro of 3GPP, high rate packet data (HRPD), ultra mobile broadband (UMB) of 3GPP2, and 802.16e of the Institute of Electrical and Electronics Engineers (IEEE).

As a representative example of the broadband wireless communication systems, LTE systems employ orthogonal frequency division multiplexing (OFDM) for a downlink (DL) and employs single carrier-frequency division multiple access (SC-FDMA) for an uplink (UL). The UL refers to a radio link for transmitting data or a control signal from a terminal (e.g., a UE or an MS) to a base station (e.g., an eNB or a BS), and the DL refers to a radio link for transmitting data or a control signal from the base station to the terminal. The above-described multiple access schemes identify data or control information of each user in a manner that time-frequency resources for carrying the data or control information of each user are allocated and managed not to overlap each other, that is, to achieve orthogonality therebetween.

As post-LTE communication systems, i.e., 5G communication systems need to support services capable of freely reflecting and simultaneously satisfying various requirements of users, service providers, and the like. Services considered for the 5G systems include enhanced mobile broadband (eMBB), massive machine-type communication (mMTC), ultra-reliability low-latency communication (URLLC) services, or the like.

According to some embodiments, the eMBB aims to provide an improved data rate than a data rate supported by the legacy LTE, LTE-A, or LTE-Pro. For example, in a 5G communication system, the eMBB should be able to provide a peak data rate of 20 Gbps in a DL and a peak data rate of 10 Gbps in an UL at one BS. Also, the 5G communication system has to simultaneously provide the peak data rate and an increased user-perceived data rate of a UE. In order to satisfy such requirements, there is a need for an improvement the 5G communication system with respect to transmission and reception technology including an improved multiple-input multiple-output (MIMO) transmission technology. Also, a data rate required in the 5G communication system may be satisfied by using a frequency bandwidth wider than 20 MHz in the 3 GHz to 6 GHz or 6 GHz or more frequency band, instead of the LTE transmitting a signal by using maximum 20 MHz in the 2 GHz band.

The mMTC is being considered to simultaneously support application services such as IoT in the 5G communication system. In order to efficiently provide the IoT, the mMTC may require the support for a large number of terminals in a cell, improved coverage for a terminal, improved battery time, reduced costs of a terminal, and the like. Because the IoT is attached to various sensors and various devices to provide a communication function, the mMTC should be able to support a large number of terminals (e.g., 1,000,000 terminals/km$^2$) in a cell. Also, because a terminal supporting the mMTC is likely to be located in a shadow region failing to be covered by the cell, such as the basement of a building, due to the characteristics of the service, the terminal may require wider coverage than other services provided by the 5G communication system. The terminal supporting the mMTC should be configured as a low-cost terminal and may require a very long battery life time of 10 to 15 years because it is difficult to frequently replace the battery of the terminal.

Lastly, the URLLC refers to cellular-based wireless communication services used for mission-critical purposes such as services for remote control of robots or machinery, industrial automation, unmanned aerial vehicles, remote health care, emergency alerts, and the like. Therefore, the URLLC should provide communications providing very low latency (ultra-low latency) and very high reliability (ultra reliability). For example, a service supporting the URLLC should satisfy air interface latency of less than 0.5 milliseconds, and simultaneously has a requirement for a packet error rate of 10$^{-5}$ or less. Thus, for the service supporting the URLLC, the 5G system should provide a transmit time interval (TTI) smaller than other services and may simultaneously have a design requirement for allocating wide resources in a frequency band so as to ensure reliability of a communication link.

The three services, i.e., the eMBB, the URLLC, and the mMTC, which considered in the 5G communication system, may be multiplexed and transmitted in one system. Here, in order to satisfy different requirements of the services, the services may use different transceiving schemes and different transceiving parameters. However, the above-described mMTC, URLLC, and eMBB services are merely examples and the types of services to which the disclosure is applicable are not limited thereto.

Hereinafter, for convenience of descriptions, the disclosure uses terms and names defined in the LTE and NR standards which are the most recent standards defined in the 3GPP standard among current communication standards. However, the disclosure is not limited to these terms and names, and may be equally applied to systems conforming to other standards. In particular, the disclosure may be applied to the 3GPP NR (or the 5G mobile communication standard). Also, embodiments of the disclosure may be applied to other communication systems having similar technical backgrounds or channel types. Furthermore, the embodiments of the disclosure may be applied to other communication systems through partial modification without greatly departing from the scope of the disclosure based on determination by one of ordinary skill in the art.

Hereinafter, a procedure in which a UE generates a MAC control element (MAC CE) that is a control message of a MAC layer to notify a beam failure recovery with respect to a special cell (SpCell) in a wireless communication system, and a detailed message format are proposed.

In the disclosure, a BS may clearly detect the reason the UE performs a random access, and thus, may provide required beam-associated additional configuration to the UE, such that communication may be seamlessly performed in a beam-based communication system.

FIG. 1A is a diagram illustrating a structure of an NR system according to an embodiment of the disclosure. Referring to FIG. 1A, a wireless communication system may include multiple BSs 1a-05, 1a-10, 1a-15, and 1a-20, an access and mobility management function (AMF) 1a-20, and a user plane function (UPF) 1a-30. A UE (or terminal) 1a-35 may access an external network via the BSs 1a-05, 1a-10, 1a-15, or 1a-20 and the UPF 1a-30. However, the wireless communication system is not limited to the example of FIG. 1A, and may include more elements or fewer elements than the elements illustrated in FIG. 1A.

The BSs 1a-05, 1a-10, 1a-15, and 1a-20 are access nodes of a cellular network and may provide radio accesses to UEs that access the network. That is, the BSs 1a-05, 1a-10, 1a-15, and 1a-20 may collect state information such as a buffer state, an available transmission power state, a channel state, or the like of UEs and may perform scheduling to support connection between the UEs and a core network (CN) so as to service users' traffic. A communication system including the NR system may be configured to process traffic by being divided into a user plane (UP) related to transmission of actual user data and a control plane (CP) related to connection management, and in the drawing, the gNBs 1a-05 and 1a-20 may use a UP and CP-associated technology defined in the NR technology and the ng-eNBs 1a-10 and 1a-15 connected to the 5GC may use a UP and CP-associated technology defined in the LTE technology.

The AMF (or SMF) 1a-25 may be an entity to perform a mobility management function and various control functions with respect to a UE and may be connected to a plurality of BSs, and the UPF 1a-30 may be a gateway to provide data transmission.

Figure 1B:
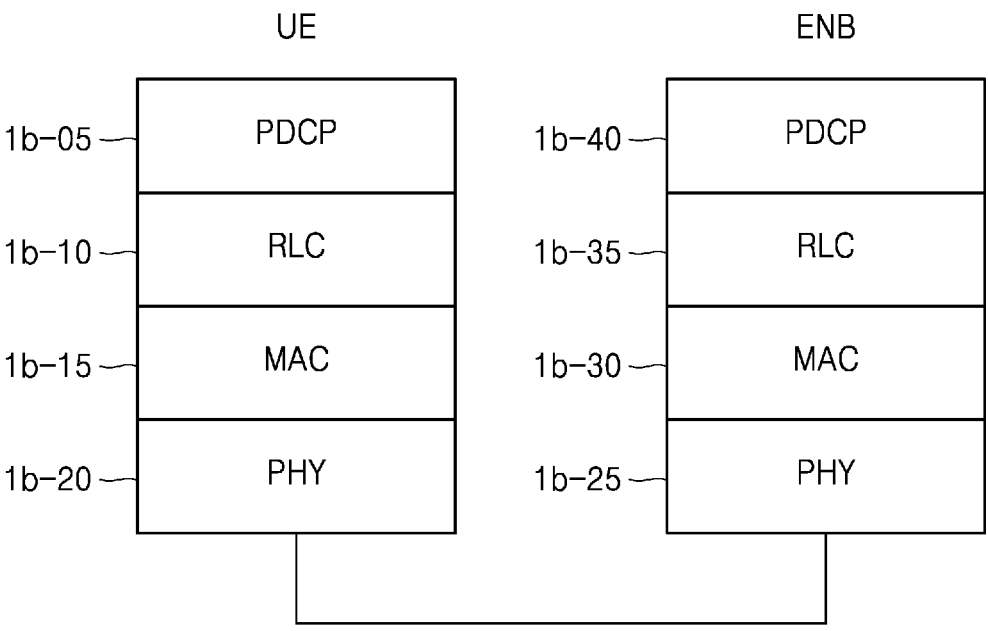
FIG. 1B is a diagram illustrating a radio protocol architecture of long term evolution (LTE) and NR systems according to an embodiment of the disclosure.

FIG. 1B is a diagram illustrating a radio protocol architecture of LTE and NR systems according to an embodiment of the disclosure.

Referring to FIG. 1B, the radio protocol architecture of the LTE system may include packet data convergence protocol (PDCP) layers (or entities) 1b-05 and 1b-40, radio link control (RLC) layers (or entities) 1b-10 and 1b-35, and MAC layers (or entities) 1b-15 and 1b-30 respectively for a UE and an eNB.

The PDCP layer 1b-05 or 1b-40 may perform Internet protocol (IP) header compression/decompression, and the RLC layer 1b-10 or 1b-35 may reconfigure a PDCP protocol data unit (PDU) to appropriate sizes.

The MAC layer 1b-15 or 1b-30 may be connected to a plurality of RLC layers configured for one UE and may multiplex RLC PDUs into a MAC PDU and may demultiplex the RLC PDUs from the MAC PDU.

A physical (PHY) layer 1b-20 or 1b-25 may channel-code and modulate upper layer data into OFDM symbols and transmit the OFDM symbols via a wireless channel, or may demodulate OFDM symbols received via a wireless channel and channel-decode and deliver the OFDM symbols to a higher layer. Also, the physical layer may use a hybrid automatic repeat request (HARQ) for additional error correction, and a receiving end may transmit, in 1 bit, information about whether a packet transmitted by a transmitting end is received. This may be referred to as HARQ ACK/NACK information.

In the LTE system, DL HARQ ACK/NACK information about UL data transmission may be transmitted on a physical hybrid-ARQ indicator channel (PHICH) physical channel, and in the NR system, DL HARQ ACK/NACK information may be provided based on UE scheduling information on a physical dedicated control channel (PDCCH) that is a channel on which DL/UL resource allocation is transmitted. That is, in the NR system, a BS or a UE may determine, via the PDCCH, whether retransmission or new transmission of UL data is requested. This is because asynchronous HARQ is applied in the NR system. UL HARQ ACK/NACK information about DL data transmission may be transmitted on a physical uplink control channel (PUCCH) or physical uplink shared channel (PUSCH) physical channel. In general, the PUCCH is transmitted in a UL of a primary cell (PCell) to be described below, but, when a UE supports, a BS may allow a secondary cell (SCell) to additionally transmit it to the UE, and this is referred to as the PUCCH SCell.

Although not illustrated in drawings, radio resource control (RRC) layers may be present above the PDCP layers of the UE and the BS, respectively, and each of the RRC layers may transmit or receive configuration control messages related to access and measurement to control radio resources. For example, the BS may indicate measurement to the UE by using a message of the RRC layer, and the UE may report, to the BS, a measurement result by using a message of the RRC layer.

The PHY layer may be configured to use one or more frequencies/carriers, and a technology by which one BS simultaneously configures and uses a plurality of frequencies is referred to as a carrier aggregation (CA) technology. Only one carrier was used for communication between a UE (or terminal) and a BS (eNB of LTE or gNB of NR), but, according to the CA technology, one main carrier and one or more subcarriers are additionally used such that an amount of data transmission may be significantly increased as much as the number of subcarriers. In the LTE system, a cell in a BS which uses a main carrier is referred to as a PCell, and a cell which uses subcarrier is referred to as a SCell. A technology in which the CA function is extended to two BSs is referred to as a dual connectivity (DC) technology. According to the DC technology, a UE is simultaneously connected to a master BS (Master E-UTRAN NodeB (MeNB)) and a secondary BS (Secondary E-UTRAN NodeB (SeNB)) and uses them, and cells included in the master BS are referred to as a master cell group (MCG) and cells included in the secondary BS are referred to as a secondary cell group (SCG). Each cell group has a representative cell, and a representative cell of an MCG is referred to as a primary cell (PCell) and a representative cell of a SCG is referred to as a primary secondary cell (PSCell). When using the NR described above, a UE may use the LTE technology in the MCG and may use the NR in the SCG, thereby simultaneously using the LTE and the NR. In the NR, each cell group (i.e., MCG or SCG) may have up to 16 serving cells (PCell and SCells for the MCG; PSCell and SCells for the SCG).

Figure 1C:
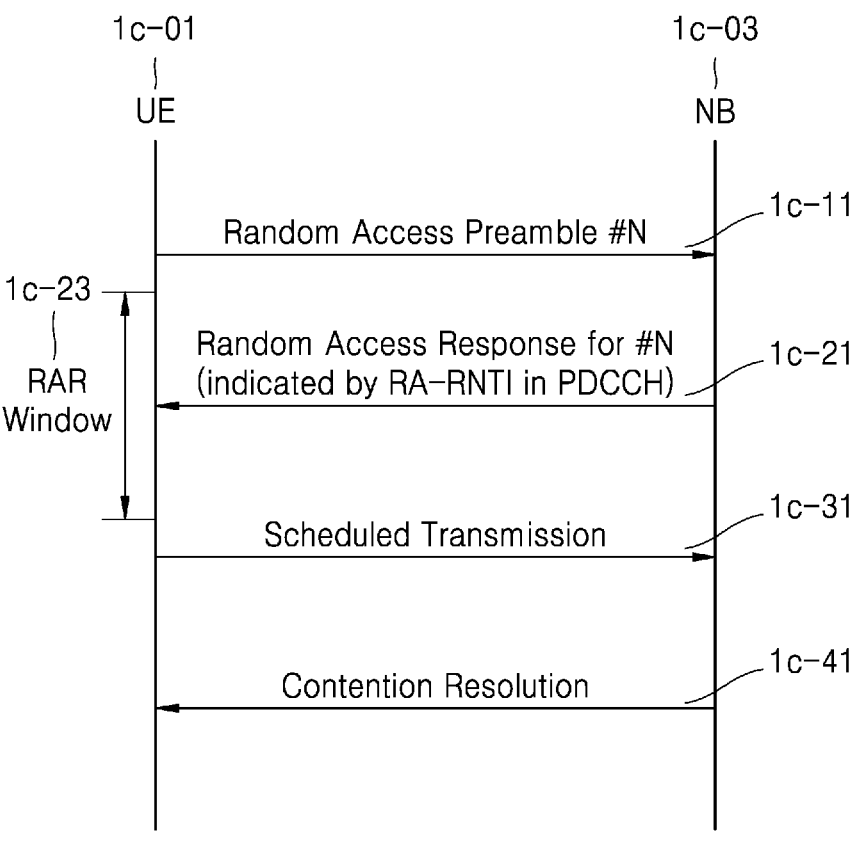
FIG. 1C is a diagram illustrating a contention-based 4-step random access procedure performed by a UE with respect to a base station (BS) according to an embodiment of the disclosure.

FIG. 1C is a diagram illustrating a contention-based 4-step random access procedure performed by a UE with respect to a NB in various cases requiring initial access, re-access, handover, and other random accesses, according to an embodiment of the disclosure.

In order to access a NB 1c-03, a UE 1c-01 selects a physical random access channel (PRACH) according to FIG. 1C and transmits a random access preamble to the corresponding PRACH (1c-11). According to an embodiment of the disclosure, one or more UEs 1c-01 may simultaneously transmit the random access preamble on a PRACH resource. The PRACH resource may be over one subframe, or only some symbols within one subframe may be used.

Also, according to an embodiment of the disclosure, information about the PRACH resource may be included in system information broadcast by the NB 1c-03, and thus, the UE may identify on which time and frequency resources the preamble should be transmitted. Also, the random access preamble is a specific sequence specially designed to be received even when transmitted before being completely synchronized with the NB 1c-03, and there may be a plurality of preamble identifiers (indices) according to the standard. When there are the plurality of preamble identifiers, the preamble to be transmitted by the UE 1c-01 may be randomly selected by the UE or may be a specific preamble designated by the NB 1c-03.

When the NB 1c-03 receives the preamble, the NB 1c-03 transmits, to the UE 1c-01, a random access response (hereinafter referred to as RAR) message (also referred to as Msg2) in response thereto (1c-21). The RAR message may include identifier information about the preamble used in operation 1c-11, and may include UL transmission timing correction information, and UL resource allocation information and temporary UE identifier information to be used in subsequent operation (i.e., 1c-31).

According to an embodiment of the disclosure, when a plurality of UEs transmit different preambles to attempt random access in operation 1c-11, the RAR message may include responses to each preamble, and the identifier information about the preamble may be transmitted to indicate which preamble the corresponding response is a response message to. The UL resource allocation information included in each response to each preamble may be detailed information about a resource to be used by the UE in operation 1c-31, and may include a physical location and a size of the resource, a modulation and coding scheme (MCS) used for transmission, and control information about power during transmission. When the UE that has transmitted the preamble performs an initial access, the UE does not have the identifier allocated by the BS for communication with the BS, the temporary UE identifier information may be a value transmitted to be used for this purpose.

On the other hand, the RAR message may include the response(s) for each preamble and may optionally include a backoff indicator (BI). When the random access preamble has to be retransmitted because random access is not successfully performed, the backoff indicator may be a value transmitted so as to delay transmission at random according to the value of the backoff indicator without retransmitting the preamble immediately.

More specifically, when the UE does not properly receive the RAR, or when contention resolution to be described below is not properly achieved, the UE may have to retransmit the random access preamble. In this case, the value indicated by the backoff indicator may be indicated by an index value below, and the UE may select a random value within a range of 0 to a value indicated by the index value and may retransmit the random access preamble after a time corresponding to the value. For example, when the BS indicates 5 (i.e., 60 ms) as the BI value and the UE randomly selects a value of 23 ms from 0 ms to 60 ms, the selected value is stored in a variable called PREAMBLE BACKOFF, and the UE performs a procedure for retransmitting the preamble after 23 ms. If the backoff indicator is not transmitted, when the random access preamble has to be retransmitted because random access is not successfully performed, the UE may directly transmit the random access preamble.

TABLE 1

| Index | Backoff Parameter value (ms) |
|---|---|
| 0 | 5 |
| 1 | 10 |
| 2 | 20 |
| 3 | 30 |
| 4 | 40 |
| 5 | 60 |
| 6 | 80 |
| 7 | 120 |
| 8 | 160 |
| 9 | 240 |
| 10 | 320 |
| 11 | 480 |
| 12 | 960 |
| 13 | 1920 |
| 14 | Reserved |
| 15 | Reserved |

The RAR message has to be transmitted within a certain period starting from a certain time after the transmission of the preamble, and the certain period starting after the certain time after the transmission of the preamble is referred to as a "RAR window." The RAR window may be a time period starting from a time point when a certain time has passed after the transmission of the preamble. The certain time may be a time point when a PDCCH for scheduling an RAR message is first monitored. Also, a length of the RAR window may be a certain value configured by the BS for each PRACH resource or one or more PRACH resource sets in a system information message broadcast by the BS. When the RAR message is transmitted, the BS schedules the corresponding RAR message on the PDCCH, and the corresponding scheduling information may be scrambled by using random access-radio network temporary identifier (RA-RNTI). The RA-RNTI is mapped to the PRACH resource used to transmit the message in operation 1c-11, and the UE that has transmitted the preamble on a specific PRACH resource may attempt to receive the PDCCH based on the RA-RNTI and may determine whether there is an RAR message corresponding thereto. When the RAR message is a response to the preamble transmitted by the UE in operation 1c-11, as illustrated in this example diagram, the RA-RNTI used for the RAR message scheduling information includes information about transmission in operation 1c-11. To this end, the RA-RNTI may be calculated by using Equation below. However, the disclosure is not limited to the example below: $RA\text{-}RNTI=1+s\_id+14\times t\_id+14\times 80\times f\_id+14\times 80\times 8\times ul\_carrier\_id$ (Equation 1)

Here, s_id is an index corresponding to a first OFDM symbol on which the transmission of the preamble transmitted in operation 1c-11 is started, and may have a value of $0 \leq s\_id < 14$ (i.e., a maximum number of OFDMs in one slot).

Also, t_id is an index corresponding to a first slot in which the transmission of the preamble transmitted in operation 1c-11 is started, and may have a value of $0 < t\_id < 80$ (i.e., a maximum number of slots in one system frame (10 ms)).

Also, fid represents on which PRACH resource the preamble transmitted in operation 1c-11 is transmitted on a frequency, and may have a value of $0 \leq f\_id < 8$ (i.e., a maximum number of PRACHs on a frequency within the same time).

ul_carrier_id may be a parameter for, when two carriers are used for UL for one cell, identifying whether the preamble is transmitted in a normal uplink (NUL) (in this case, 0) or whether the preamble is transmitted in a supplementary uplink (SUL) (in this case, 1).

The UE that has received the RAR message transmits another message on the resource allocated to the RAR message according to the various purposes described above (1c-31). The third-transmitted message in the example drawing is also referred to as Msg3 (that is, the preamble in operation 1c-11 or 1c-13 is also referred to as Msg1, and the RAR in operation 1c-21 is referred to as Msg2.) As an example of Msg3 transmitted by the UE, in a case of initial access, an RRCSetupRequest message that is a message of the RRC layer may be included, in a case of reconnection, an RRCReestablishmentRequest message may be included, and in a case of handover, an RRCReconfigurationComplete message may be included, but the disclosure is not limited thereto. Alternatively, a buffer status report (BSR) message for resource request may be transmitted as Msg3.

Afterward, for the case of initial transmission (that is, Msg3 does not include BS identifier information previously allocated to the UE, etc.), the UE may receive a contention resolution message from the BS (1c-41). The contention resolution message includes the contents transmitted by the UE in Msg3 as it is, and even when there are a plurality of UEs that have selected the same preamble in operation 1c-11 or 1c-13, it is possible to notify about which UE is the response to.

Figure 1D:
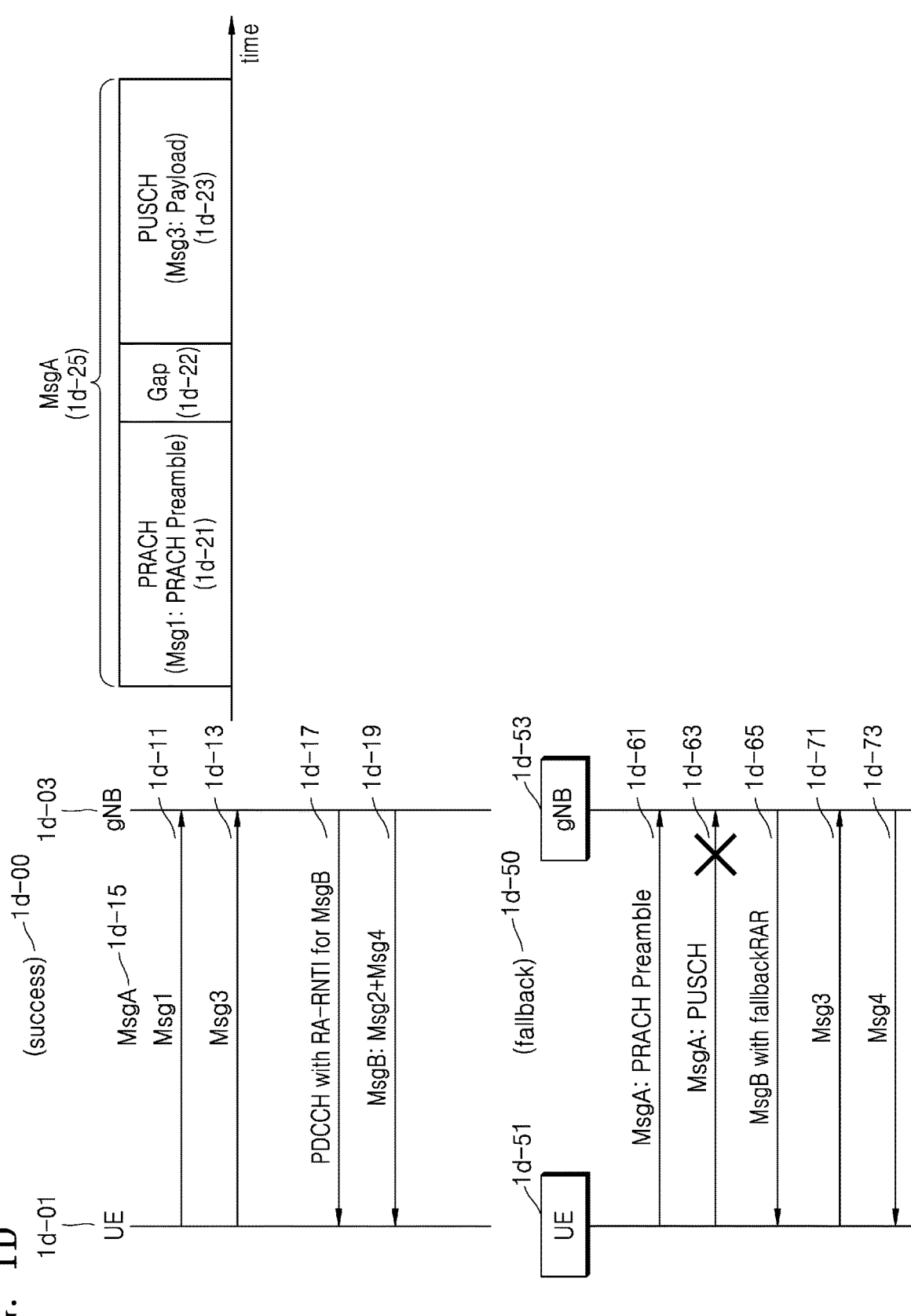
FIG. 1D is a diagram illustrating a 2-step random access procedure performed by a UE with respect to a BS according to an embodiment of the disclosure.

FIG. 1D is a diagram illustrating a 2-step random access procedure performed by a UE with respect to a gNB according to an embodiment of the disclosure.

In a case where general contention-based random access is performed as described above with reference to FIG. 1C, at least four steps may be performed, and if an error occurs in one step, the procedure may be further delayed. Therefore, a scenario of reducing the random access procedure to a 2-step procedure may be considered.

To this end, MsgA that consecutively transmits preamble Msg1 1d-11 (corresponding to 1c-11) and preamble Msg3 1d-13 (corresponding to 1c-31) of a 4-step random access procedure is transmitted (1d-15), and after that, the gNB that has received MsgA receives MsgB 1d-19 including information about Msg2 (RAR) (corresponding to 1c-21) and Msg4 (corresponding to 1c-41) of the 4-step random access procedure, such that the random access procedure may be reduced. This procedure is described in FIG. 1D (1d-00).

Here, when MsgA is illustrated in time, MsgA may be the respective transmissions of Msg1 and Msg3. For example, MsgA may be transmitted on a PRACH resource 1d-21 for transmitting Msg1, a PUSCH resource 1d-23 for transmitting Msg3, and a gap resource 1d-22 for resolving an interference problem that may occur during transmission on the PUSCH resource. Also, because Msg3 includes information associated with Msg1, the gNB may identify which UE transmitted the Msg3 by identifying preamble (Msg1) transmitted by the UE. Alternatively, there may be a plurality of PUSCH resources corresponding to a PRACH resource, and thus, there may be a rule for mapping a PUSCH resource to be used in transmission of Msg3 according to a preamble index transmitted on the PRACH resource, such that the gNB may identify which UE transmitted the Msg3 by identifying preamble (Msg1) transmitted by the UE.

As described above with reference to FIG. 1C, the UE may perform random access for various purposes. For example, the UE that is not yet connected to the gNB may perform random access to transmit a message for connection, or the UE that was connected but is not disconnected due to an error may perform random access to transmit a message for reestablishing connection, and the message may be a message belonging to a common control channel (CCCH). A control message belonging to the CCCH may include RRCSetupRequest (when transitioning from an idle mode (RRC_IDLE) to a connected mode), RRCResumeRequest (when transitioning from an inactive mode (RRC INACTIVE) to a connected mode), RRCReestablishmentRequest (when reestablishing connection), and RRC SystemInfoRequest (when requesting system information broadcast by the BS), and the disclosure is not limited to the above examples. Accordingly, when the UE performs the 2-step random access, the UE may transmit MsgA by including the messages in MsgA. If the UE accesses the gNB and then performs random access in a connected state, the UE may notify, in MsgA, that an entity performing the random access is the UE by transmitting C-RNTI MAC CE including identifier information of the UE.

The gNB that has received both Msg1 and Msg3 included in MsgA may transmit MsgB to the UE (1d-19). Here, MsgB may include the BI described above. Also, when MsgA includes the CCCH message described above, UL transmission timing information (timing advance command (TAC)) transmitted in Msg2 described above, temporary identifier (temporary C-RNTI) of the UE which is to be used by the gNB at a later time, and UE contention resolution identity transmitted in Msg4 may be included. Also, if the UE is already connected to the gNB and transmits, in MsgA, C-RNTI MAC CE including identifier information of the UE, a message via which the gNB allocates a resource to the UE on a PDCCH by an identifier (C-RNTI) of the UE may be MsgB.

If a collision occurs due to transmission of multiple MsgAs in operation 1d-15, the gNB is able to receive only Msg1(s) included in MsgA and is not able to receive Msg3. In this case, the gNB may transmit Msg2 1d-65 to the UE, instead of MsgB 1d-19, and thus, may change to the 4-step random access procedure described with reference to FIG. 1c and may perform the remaining random access procedure. This is described in FIG. 1D (1d-50), and a mode of switching from the 2-step random access to the 4-step random access as described above is referred to as a fallback mode. That is, when the gNB receives, from the UE, a message only on the PRACH resource (1d-61) and (1d-21), the gNB transmits a response thereto to the UE via fallback-RAR similar to Msg2 used in the 4-step random access procedure (1d-65), thereby allowing the UE to perform transmission and reception of Msg3 (1d-71) and Msg4 (1d-73) of the 4-step random access procedure.

Figure 1E:
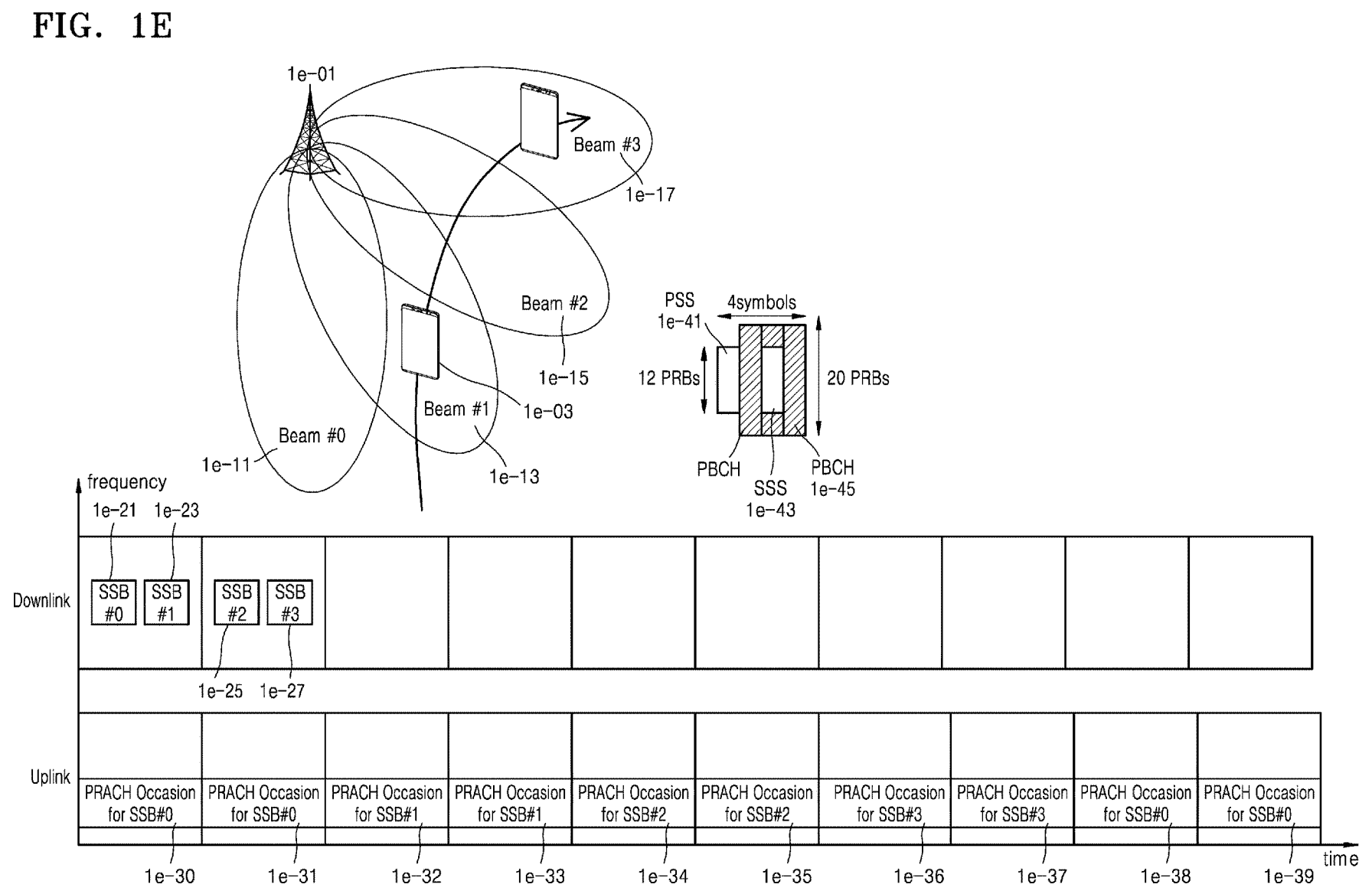

FIG. 1E is a diagram illustrating an example of DL and UL channel frame structures when communication is performed based on a beam in an NR system according to an embodiment of the disclosure.

In FIG. 1E, a BS 1e-01 may transmit a signal in the form of beams 1e-11, 1e-13, 1e-15, and 1e-17 for wide coverage or transmitting a stronger signal. Therefore, a UE 1e-03 in a cell may have to transmit and receive data by using a specific beam (beam #1 1e-13 in FIG. 1E) transmitted by the BS.

A state of the UE may be divided into an idle mode (RRC_IDLE) state and a connected mode (RRC_CONNECTED) state according to whether the UE is connected to the BS. Therefore, the BS may not know the location of the UE in the idle mode state.

If the UE in the idle mode state attempts to transition to a connected mode state, the UE may receive synchronization signal blocks (SSBs) 1e-21, 1e-23, 1e-25, and 1e-27 that are transmitted by the BS. The SSB may be an SSB signal that is periodically transmitted by the BS at regular intervals, and each SSB may include a primary synchronization signal (PSS) 1e-41, a secondary synchronization signal (SSS) 1e-43, and a physical broadcast channel (PBCH).

In FIG. 1E, a scenario in which an SSB is transmitted on each beam is assumed. For example, it is assumed that SSB #0 1e-21 is transmitted by using beam #0 1e-11, SSB #1 1e-23 is transmitted by using beam #1 1e-13, SSB #2 1e-25 is transmitted by using beam #2 1e-15, and SSB #3 1e-27 is transmitted by using beam #3 1e-17. Also, in FIG. 1E, it is assumed that the UE in the idle mode is located in beam #1, but even when the UE in the connected mode performs random access, the UE selects an SSB received when the UE performs random access.

Referring to FIG. 1E, the UE may receive SSB #1 transmitted on beam #1. When receiving SSB #1, the UE obtains a physical cell identifier (PCI) of the BS via the PSS and the SSS. Because the UE receives the PBCH, the UE may identify an identifier (i.e., #1) of the currently received SSB, at what location the current SSB is received within a 10 ms frame, and in which one of system frame numbers (SFNs) having a period of 10.24 seconds the current SSB is received. Also, a master information block (MIB) may be included in the PBCH, and may include information about a location at which system information block type 1 (SIB1) that broadcasts more detailed cell configuration information is receivable. When receiving SIB1, the UE may know a total number of SSBs transmitted by the BS, and may identify locations of physical random access channel (PRACH) occasions 1e-30 to 1e-39 in which the UE is capable of performing random access to transition to the connected mode state (more specifically, capable of transmitting a preamble that is a physical signal specially designed for UL synchronization) (in FIG. 1E, assuming a scenario in which the SSB is allocated every 1 ms).

In addition, the UE may know which one of PRACH occasions is mapped to which SSB index, based on the information of SIB1. For example, in FIG. 1E, a scenario in which the SSB is allocated every 1 ms is assumed, and a scenario in which ½ SSB is allocated per PRACH occasion (i.e., two PRACH occasions per SSB) is assumed. Accordingly, a scenario in which two PRACH occasions are allocated for each SSB from the start of the PRACH occasion starting according to an SFN value is illustrated. That is, the PRACH occasion 1e-30 and the PRACH occasion 1e-31 may be allocated for SSB #0, and the PRACH occasion 1e-32 and the PRACH occasion 1e-33 may be allocated for SSB #1. After all the SSBs are configured, PRACH occasion may be allocated again for a first SSB (PRACH occasion 1e-38 and PRACH occasion 1e-39).

Accordingly, the UE may recognize locations of the PRACH occasions 1e-32 and 1e-33 for SSB #1, and may transmit a random access preamble in the earliest PRACH occasion (e.g., PRACH occasion 1e-32) at the current time among the PRACH occasions 1e-32 and 1e-33 corresponding to SSB #1. Because the BS has received the preamble in the PRACH occasion 1e-32, the BS may know that the UE selected SSB #1 and transmitted the preamble, and may transmit and receive data on a beam corresponding to SSB #1 when random access is performed thereafter.

When the UE in the connected state moves from a source BS to a target BS due to handover or the like, the UE may perform random access to the target BS and may perform an operation of selecting an SSB and transmitting random access. In addition, during handover, a handover command is transmitted to the UE to move from the source BS to the target BS, and in this case, a dedicated random access preamble identifier may be allocated to a handover command message for each SSB of the target BS so as to be used when random access is performed on the target BS. Here, the BS may not allocate a dedicated random access preamble identifier with respect to all beams (according to the current location of the UE, etc.), and accordingly, a dedicated random access preamble may not be allocated to some SSBs (e.g., a dedicated random access preamble is allocated only to Beam #2 and Beam #3).

When a dedicated random access preamble is not allocated to the SSB selected by the UE for preamble transmission, the UE may randomly select a contention-based random access preamble and then may perform random access. For example, in this drawing, after the UE first performs random access by being located in Beam #1 but fails, a scenario in which, when the UE transmits the random access preamble again, the UE is located in Beam #3 and transmits the dedicated preamble may be possible. Random access. That is, when preamble retransmission occurs even within one random access procedure, a contention-based random access procedure and a contention-free based random access procedure may coexist according to whether the dedicated random access preamble is allocated to the selected SSB for each preamble transmission.

Also, even when the handover is not performed as described above, if the UE suddenly moves within one BS, the UE may exit a beam used in current data transmission and reception, and if the BS cannot detect it and fails to change the beam, the UE may detect a beam failure. This is referred to as beam failure detection (BFD).

For example, the BS may configure, by a message of an RRC layer, the UE in the connected state to detect a beam failure with respect to an SSB corresponding to beam #1 1e-13 and beam #2 1e-15. However, when the UE suddenly moves to beam #3 1e-17, both beam #1 1e-13 and beam #2 1e-15 are not detected, and thus, a physical layer of the UE transmits a beam failure instance indication to a MAC layer of the UE. When the MAC layer receives the beam failure instance indication, the MAC layer may start a beam failure detection timer (beamFailureDetectionTimer) (or may restart the timer when the beam failure detection timer is already running), and may increase a counter (BFI COUNTER) by 1. If a value of the counter reaches (i.e., is equal to or greater than) a threshold value (beamFailureInstanceMaxCount) configured by the message of the RRC layer, the UE determines occurrence of the beam failure and then performs a procedure for a beam failure recovery.

The beam failure may occur in a SpCell or a SCell. For example, when the SpCell uses a low frequency that hardly uses a beam and the SCell uses a high frequency that uses a narrow-width beam, the beam failure may occur in the SCell. However, the disclosure is not limited to the example above.

According to an embodiment of the disclosure, a SpCell may indicate a cell including a PCell (for which the UE performed initial access or reestablishment procedure) of a MCG and a PSCell of a SCG for which random access is performed in a SCG addition and change procedure (reconfiguration with sync) when the DC technology simultaneously using two BSs (the MCG and the SCG) is used.

If the beam failure occurs in the S Cell, the UE may notify in which SCell the beam failure occurred, by transmitting a MAC CE that is a control message of the MAC layer. In more detail, the MAC CE may include additional information indicating in which SCell the beam failure occurred and which beam in the S Cell is to be used. In order to transmit the MAC CE, the UE may request the BS for a UL resource. The MAC CE used for the purpose is referred to as a beam failure recovery (BFR) MAC CE or SCell BFR MAC CE.

A legacy UL resource request in the LTE and NR is performed by transmitting a buffer status report (BSR) MAC CE, and in a case of a regular BSR that is one of conditions for triggering BSR transmission, the UE triggers a scheduling request (SR) to transmit, to the BS, 1-bit information on a PUCCH resource allocated for an SR previously allocated by the message of the RRC layer, such that the BS may allocate a UL for transmission of a BSR.

However, in order to request transmission of the BFR MAC CE, the UE may transmit, to the BS, the 1-bit information on the PUCCH resource allocated for the SR previously allocated by the message of the RRC layer, such that the BS may allocate a UL for transmission of the BFR MAC CE. When the UE receives a UL after transmission of the SR, the UE may transmit a BFR MAC CE to be described below, thereby notifying the BS of the necessity of a BFR for a corresponding SCell.

When a beam failure occurs in a SpCell, the UE may recover a beam by using a random access procedure. For example, the BS may allocate a dedicated-random access preamble for each beam to the UE, in preparation for the beam failure. For example, the BS may configure a dedicated-preamble identifier for beam #3 of the drawing, and when the UE selects beam #3 while the UE performs a random access after detection of the beam failure, the UE may notify, by transmitting a dedicated-preamble identifier configured by the BS, the BS that the UE selected beam #3 after detection of the beam failure, such that the BS may adjust a beam with respect to the UE. Alternatively, even when the BS did not allocate a dedicated-random access preamble, the UE may perform a contention-based random access, thereby notifying the BS that the UE currently operates in a beam selected in the random access. In addition, the UE may include and transmit a separate additional message to notify the BS that the UE has performed a random access due to a BFR. The separate additional message includes contents described with reference to FIG. 1F below.

Figure 1F:
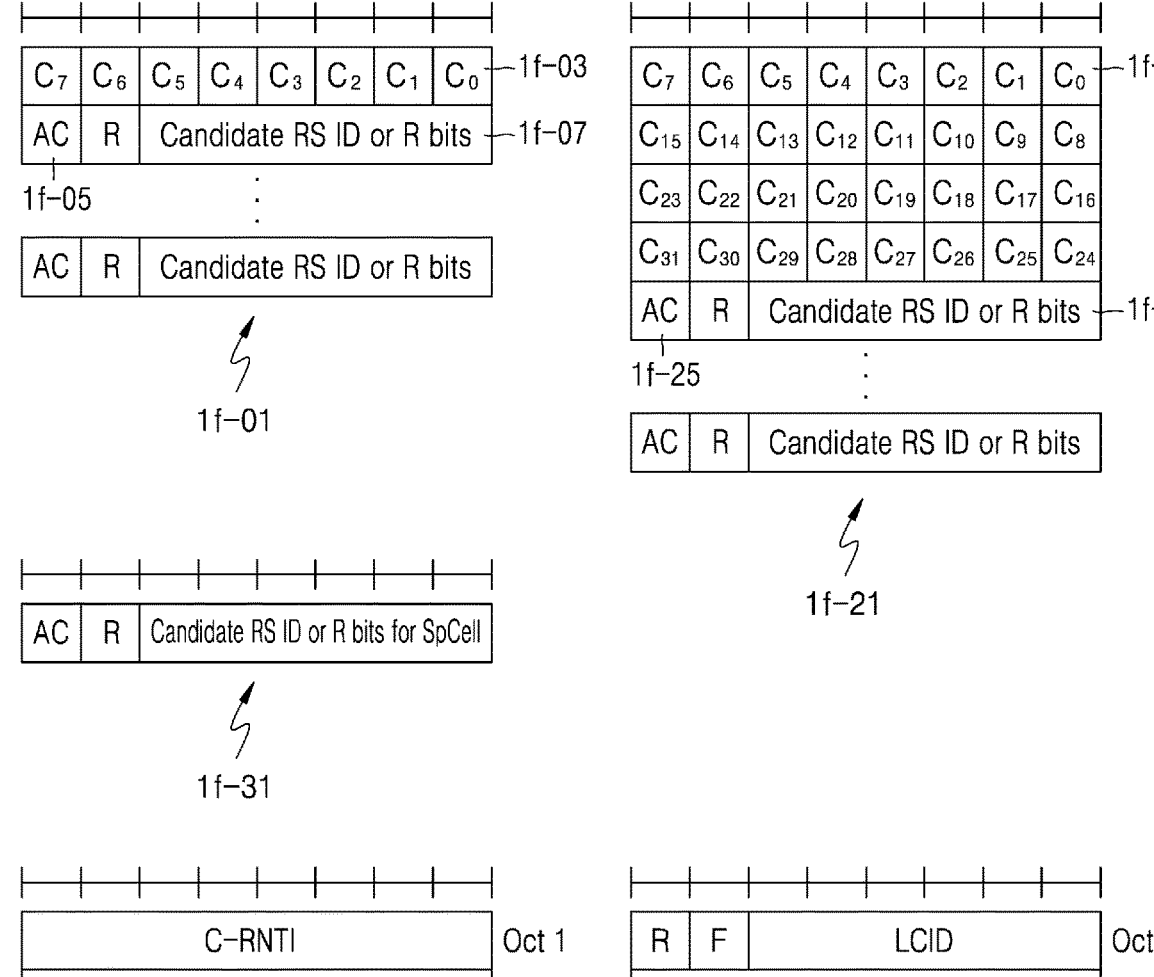
FIG. 1F is a diagram illustrating examples of a message to be transmitted to a BS when a UE performs a beam failure recovery with respect to a special cell (SpCell) according to an embodiment of the disclosure.
Figure 1F:
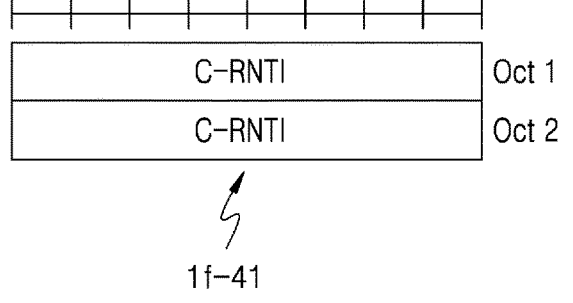
Figure 1F:
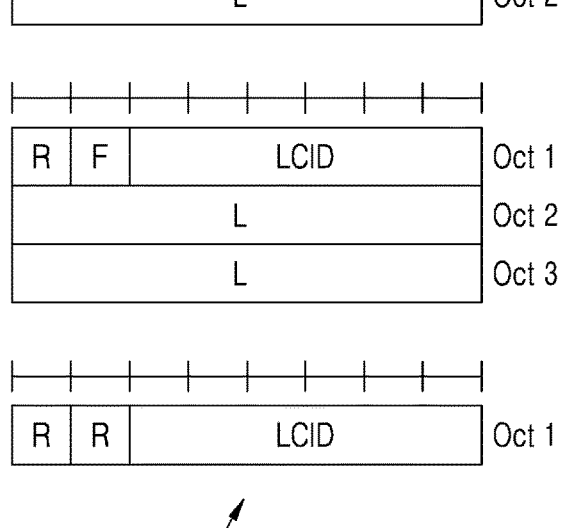

FIG. 1F is a diagram illustrating examples of a message to be transmitted to the BS when the UE performs a BFR with respect to a SpCell according to an embodiment of the disclosure.

A MAC CE 1*f*-01 and a MAC CE 1*f*-21 of FIG. 1F may be used for a SCell BFR MAC CE. According to a maximum value among SCell identifiers (or serving cell identifiers) in a corresponding cell group (MCG or SCG), the UE may use a format according to 1*f*-01 or a format according to 1*f*-21.

Referring to FIG. 1F, each C field may indicate from which serving cell a beam failure is detected, and one or multiple byte information in subsequent octet 1*f*-07 or 1*f*-27 (i.e., one byte configured of AC/R/candidate RS ID or R bits) including an AC field 1*f*-05 or 1*f*-25 may report detailed information of cells indicated as 1 in each C field.

For example, when 3 items in C field is configured as 1, after a bitmap of C fields, additional information of 3 bytes corresponding to C field configured as 1 may be transmitted. Here, the AC field 1*f*-05 or 1*f*-25 may indicate whether there is beam information (Candidate RS ID) being usable for an additional beam recovery, and if the AC field 1*f*-05 or 1*f*-25 is configured as 1, it indicates Candidate RS ID, and if it is configured as 0, the AC field may be filled with all R (reserved) bits. That is, the UE may report information about each of cells indicated as 1 in C field.

In addition, in the MAC CE 1*f*-01 and the MAC CE 1*f*-21, in order to report not only a SCell but also report a SpCell, C0 field 1*f*-03 or 1*f*-23 may be used to notify detection of a beam failure with respect to the SpCell. That is, legacy C field is used based on a SCell identifier (or a serving cell identifier), and for example, when SCell #5 has a problem, C5 field is used. However, in the disclosure, when the message is reported in the MCG, C0 field 1*f*-03 or 1*f*-23 is associated with a PCell, and when the message is reported in the SCG, C0 field 1*f*-03 or 1*f*-23 is associated with a PSCell. A serving cell identifier of PCell is 0 but, even when a serving cell identifier of PSCell is a different value other than 0, there is no serving cell that uses #0 in the SCG, and thus, the PSCell may use C0 field 1*f*-03 or 1*f*-23. Accordingly, the UE configures C0 field 1*f*-03 or 1*f*-23 as 1, thereby indicating, to the BS, detection of a beam failure with respect to a SpCell.

When C0 field 1*f*-03 or 1*f*-23 is configured as 1 in FIG. 1F, the UE may not include octet 1*f*-07 or 1*f*-27 including AC 1*f*-05 or 1*f*-25 with respect to SpCell in a MAC CE. This is because, when a random access procedure is performed, the BS can infer information about a current beam according to a preamble index transmitted by the UE and location. Alternatively, in order to maximally re-use an existing format, a MAC CE may include octet 1*f*-07 or 1*f*-27 including AC 1*f*-05 or 1*f*-25 not only for SCell but also for SpCell, and may constantly include an R bit instead of candidate RS ID. Alternatively, the MAC CE may include the octet 1*f*-07 or 1*f*-27 including AC 1*f*-05 or 1*f*-25 not only for SCell but also for SpCell, and when there is reference signal (CSI-RS) information measured with respect to the SpCell by the UE, the MAC CE may include the information and be transmitted.

A BFR MAC CE with respect to SpCell in a second embodiment is a format being different from an existing BFR MAC CE with respect to SCell. Here, one proposal is to use a MAC CE without payload. A MAC subheader 1*f*-51 is added to data including a MAC CE and being transmitted/received by a MAC layer, and in transmission of data/MAC CE having a variable length, first and second formats including L field are used according to a length of the data/MAC CE (the first one when F field is 0, and the second one when it is 1). Also, when a MAC CE has a configured length, a third format only including LCID without L field may be used.

If one of LCID values is used for a BFR MAC CE with respect to SpCell, a format including only a third MAC subheader may be transmitted. Alternatively, like an MAC CE 1*f*-31 of FIG. 1F, a format by which only octet excluding C field and including AC for SpCell may be defined. In this case, as the MAC CE 1*f*-31 without C field in the third MAC subheader of 1*f*-51 is transmitted, a size of actual transmission may be 2 bytes.

However, the disclosure is not limited to the example, and as the BFR MAC CE, a MAC CE excluding first and second MAC subheaders for transmission of data with a variable length and C field and including a format for transmission of only actet including AC for SpCell may be transmitted. Also, all combinations of the two MAC CEs 1*f*-01 and 1*f*-21 and three types of the MAC subheader 1*f*-51 in the first embodiment described above may be available.

In a third embodiment, a new MAC CE for a BFR is not introduced. In the current embodiment, when the UE in a connected state performs a random access, the UE transmits C-RNTI MAC CE 1*f*-41 to inform identity of the UE, and according to the related art, the UE indicates a C-RNTI MAC CE by inserting a value of 58 to an LCID field of a MAC subheader, but in the current embodiment, another value as well as the value of 58 is additionally allocated for the UE to inform that a current MAC CE is a C-RNTI MAC CE and the UE performs a random access for a BFR with respect to SpCell. That is, 1 byte may be further saved, compared to the second embodiment in which a MAC CE does not have a payload.

When the UE transmits data in a UL, the BS does not allocate a UL resource for particular data of the UE but allocates a resource available for all data currently in a buffer. Here, the UE does not randomly fill the allocated resource and may transmit the data on the allocated resource according to a priority order and a filling method defined by the rules. This is referred to as logical channel prioritization (LCP). In the current NR rules, a priority order with respect to MAC CEs and data are configured as below.

C-RNTI MAC CE or data from UL-CCCH;
Configured Grant Confirmation (CGC) MAC CE;
MAC CE for BSR, with exception of BSR included for padding;
Single Entry PHR MAC CE or Multiple Entry PHR MAC CE;
data from any Logical Channel, except data from UL-CCCH;
MAC CE for Recommended bit rate query;
MAC CE for BSR included for padding.

Here, a MAC CE used in reporting of a BFR with respect to SCell has very high priority so as to maintain connection, the MAC CE may have the same priority as the CGC MAC CE. However, the disclosure is not limited thereto.

As in the first embodiment, when a BFR MAC CE for SCell is equally used for SpCell from among various aforedescribed BFR MAC CE formats for SpCell, if BFR information with respect to SpCell is included in a BFR MAC CE, the BFR MAC CE may be configured to have higher priority over a CGC MAC CE. This is because a connection recovery with respect to SpCell has very high priority. Also, as in the second and third embodiments, when a format of a BFR MAC CE for SpCell is different from a format of a BFR MAC CE for SCell, the BFR MAC CE for SpCell may be configured to have higher priority over the BFR MAC CE for SCell.

Figure 1G:
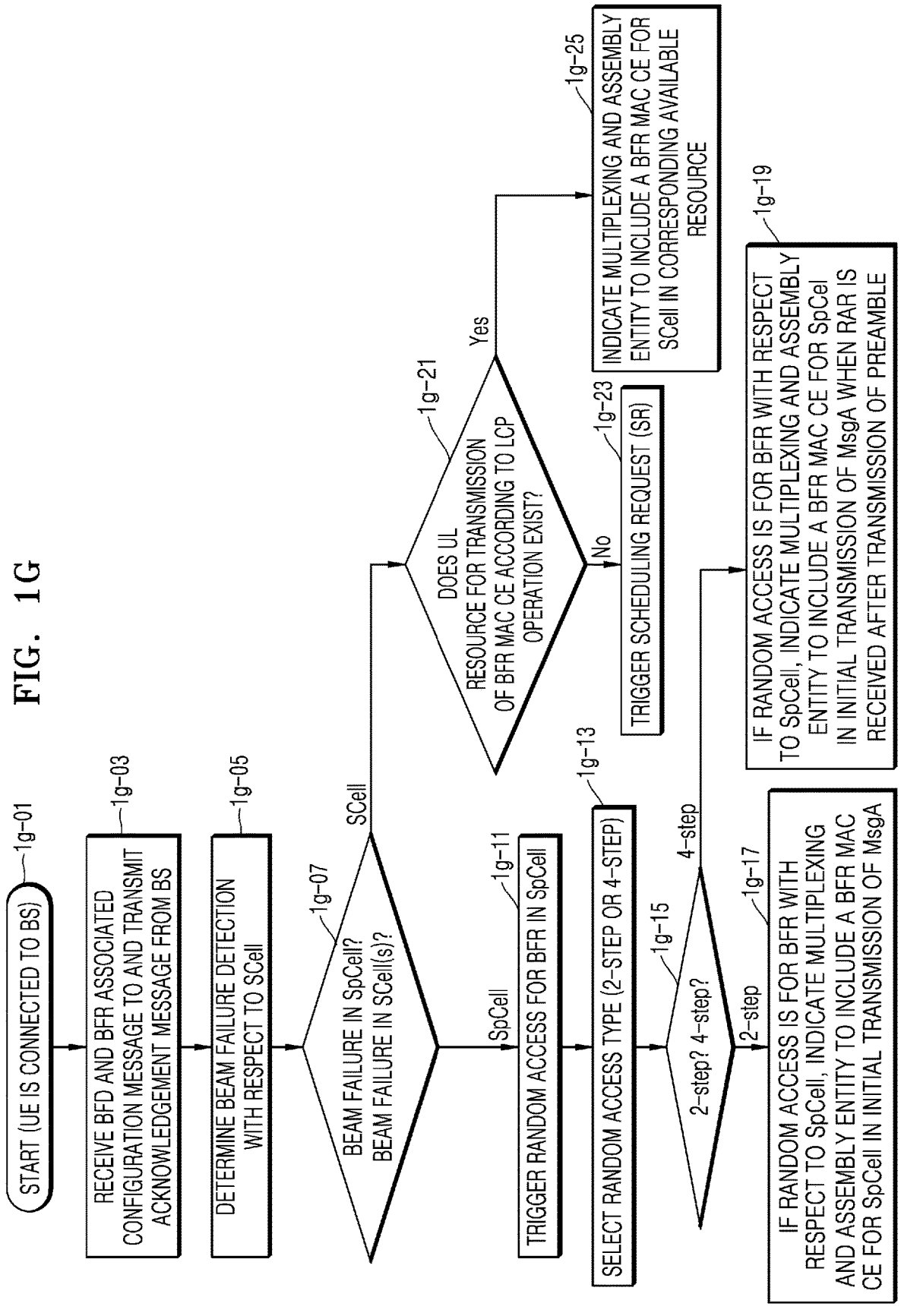
FIG. 1G is a diagram of a first example of UE operations when a UE performs beam failure detection and recovery with respect to a SpCell according to an embodiment of the disclosure.

FIG. 1G is a diagram of a first example of UE operations when the UE performs beam failure detection and recovery with respect to a SpCell according to an embodiment of the disclosure.

In FIG. 1G, it is assumed that the UE is connected to the BS and thus, is in a connected mode (RRC_CONNECTED) state (operation 1g-01). Afterward, the UE is configured, by the BS, with configuration information associated with the beam failure detection and recovery described above, and transmits an acknowledgement message corresponding thereto (operation 1g-03). The configuration information transmitted by the BS may be received by using an RRCReconfiguration message of an RRC layer, and the acknowledgement message transmitted by the UE may be transmitted by an RRCReconfigurationComplete message of an RRC layer. The configuration information received from the BS may include configuration information with which, when the UE determines a beam failure with respect to SpCell and SCell, the UE can report the beam failure.

When the UE receives the configuration information, the UE determines occurrence of the beam failure with respect to SpCell and S Cell, as described above (operation 1g-05). The UE may determine a beam failure for each serving cell, according to the beam failure detection timer and counter described above.

The UE may detect the beam failure with respect to the SpCell or the SCell (operation 1g-07).

If the beam failure is detected with respect to the SCell, the UE determines whether the UE has a UL resource for transmission of a BFR MAC CE according to a current LCP operation (operation 1g-21). If the UE has the UL resource for transmission of the BFR MAC CE, the UE may indicate a multiplexing and assembly entity, which is configured to generate data, to include a BFR MAC CE for the SCell in an available resource so as to transmit data on the corresponding resource (operation 1g-25). If the UE does not have the UL resource for transmission of the BFR MAC CE, the UE may determine whether a PUCCH SR resource for transmission of a SCell BFR MAC CE is allocated by a message of the RRC layer, and if a separate SR resource is not allocated, the UE performs a random access procedure, transmits, to the BS, a Msg3 message of a random access by adding the SCell BFR MAC CE to the Msg3 message, and thus, notifies a beam failure with respect to a particular SCell. If the BS configures the PUCCH SR resource for transmission of the SCell BFR MAC CE, the UE transmits a corresponding SR and then transmits the SCell BFR MAC CE on a UL resource received from the BS (operation 1g-23). Afterward, when the BS allocates a UL resource for new data transmission with respect to a HARQ process used for transmission of the transmitted SCell BFR MAC CE, the UE determines that the BFR MAC CE transmitted with a corresponding HARQ process ID is successfully transmitted and thus, determines that a BFR is successfully performed.

If the beam failure with respect to the SpCell is detected, the UE triggers a random access for a BFR in the SpCell (operation 1g-11). If the UE supports a 2-step random access and the BS configures a resource for the 2-step random access, the UE performs the 2-step random access when a DL signal strength is greater than a preset threshold value according to the preset threshold value configured by the BS, and otherwise, the UE determines to perform a 4-step random access (operation 1g-13). In a case where the UE determines to perform the 2-step random access (operation 1g-15), if the random access is for the BFR with respect to the SpCell, the UE indicates the multiplexing and assembly entity to include a BFR MAC CE for the SpCell in initial transmission of MsgA (operation 1g-17). Also, in a case where the UE determines to perform the 4-step random access (operation 1g-15), if the random access is for the BFR with respect to the SpCell, or in a case where the UE selects a contention-based preamble, when the UE receives an RAR after transmission of the preamble (i.e., when a resource for UL transmission is allocated in the RAR), the UE indicates the multiplexing and assembly entity to include the BFR MAC CE for the SpCell (operation 1g-19). Accordingly, the UE may transmit a corresponding MAC CE to the BS during a random access, and thus, may inform, to the BS, that the UE performed a random access for a BFR.

FIG. 1H is a diagram of a second example of UE operations when the UE performs beam failure detection and recovery with respect to a SpCell according to an embodiment of the disclosure.

In FIG. 1H, it is assumed that the UE is connected to the BS and thus, is in a connected mode (RRC_CONNECTED) state (operation 1h-01). Afterward, the UE is configured, by the BS, with configuration information associated with the beam failure detection and recovery described above, and transmits an acknowledgement message corresponding thereto (operation 1h-03). The configuration information transmitted by the BS may be received by using an RRCReconfiguration message of an RRC layer, and the acknowledgement message transmitted by the UE may be transmitted by an RRCReconfigurationComplete message of an RRC layer. The configuration information received from the BS may include configuration information with which, when the UE determines a beam failure with respect to SpCell and SCell, the UE can report it.

When the UE receives the configuration information, the UE determines occurrence of the beam failure with respect to SpCell and S Cell, as described above (operation 1h-05). The UE may determine a beam failure for each serving cell, according to the beam failure detection timer and counter described above.

The UE may detect the beam failure with respect to the SpCell or the SCell (operation 1h-07).

If the beam failure is detected with respect to the SCell, the UE determines whether the UE has a UL resource for transmission of a BFR MAC CE according to a current LCP operation (operation 1h-21). If the UE has the UL resource for transmission of the BFR MAC CE, the UE may indicate a multiplexing and assembly entity, which is configured to generate data, to include a BFR MAC CE for the SCell in an available resource so as to transmit data on the corresponding resource (operation 1h-25). If the UE does not have the UL resource for transmission of the BFR MAC CE, the UE may determine whether a PUCCH SR resource for transmission of a SCell BFR MAC CE is allocated by a message of the RRC layer, and if a separate SR resource is not allocated, the UE performs a random access procedure, transmits, to the BS, a Msg3 message of a random access by adding the SCell BFR MAC CE to the Msg3 message, and thus, notifies a beam failure with respect to a particular SCell. If the BS configures the PUCCH SR resource for transmission of the SCell BFR MAC CE, the UE transmits a corresponding SR and then transmits the SCell BFR MAC CE on a UL resource received from the BS (operation 1h-23). Afterward, when the BS allocates a UL resource for new data transmission with respect to a HARQ process used for transmission of the transmitted SCell BFR MAC CE, the UE determines that the BFR MAC CE transmitted with a corresponding HARQ process ID is successfully transmitted and thus, determines that a BFR is successfully performed.

If the beam failure with respect to the SpCell is detected, the UE triggers a random access for a BFR in the SpCell (operation 1*h*-11). Also, the UE indicates the multiplexing and assembly entity to include a BFR MAC CE for the SpCell (operation 1*h*-13). That is, the BFR MAC CE may be transmitted on a UL resource allocated during a random access, or, when a UL resource is previously allocated by the BS, the BFR MAC CE may be transmitted on the UL resource. Accordingly, when the BFR MAC CE is transmitted on a resource other than a resource received from an RAR and is determined to have been successfully received, the UE may determine that a BFR operation is successfully performed and thus may early stop the triggered random access (operation 1*h*-17). As a method, performed by the UE, of determining successful reception of the BFR MAC CE, when the BS allocates a UL resource for new data transmission with respect to a HARQ process used for transmission of the BFR MAC CE for the SpCell, the UE determines that the BFR MAC CE transmitted with a corresponding HARQ process ID has been successfully transmitted and thus, determines that a BFR is successfully performed. If the BFR MAC CE is transmitted during a random access operation, when the random access is successfully performed, the UE also determines that the BFR is successfully performed (operation 1*h*-19). According to a random access procedure, the UE may transmit the BFR MAC CE for the SpCell, thereby notifying that the UE has performed the random access due to the BFR.

According to an embodiment of the disclosure, the BS may operate to correspond to the UE operations described with reference to FIGS. 1G to 1H. For example, the BS may transmit BFD and BFR associated configuration to the UE. Also, the BS may receive a BFR MAC CE, and may configure a PUCCH SR resource for transmission of the BFR MAC CE. Also, the BS may receive an SR, and may allocate a UL resource for transmission of the BFR MAC CE. Also, the BS may allocate a UL resource for new data transmission with respect to a HARQ process used for transmission of the BFR MAC CE. That is, the BS may operate to correspond to the UE operations of performing beam failure detection and recovery.

Figure 1I:
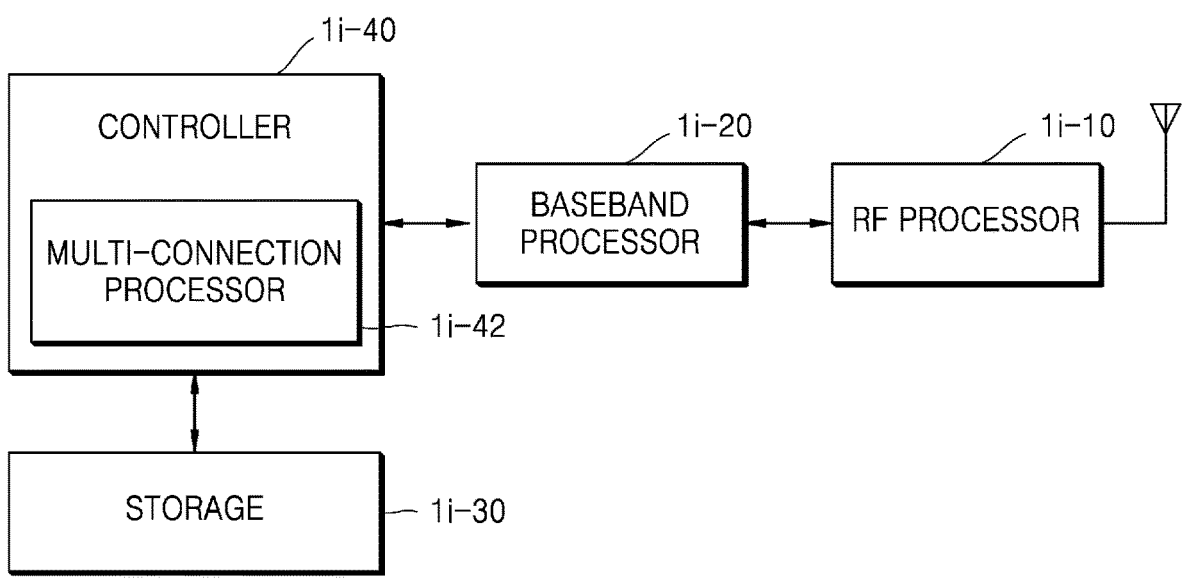
FIG. 1I is a block diagram illustrating a configuration of a UE according to an embodiment of the disclosure.

FIG. 1I is a block diagram illustrating a configuration of a UE according to an embodiment of the disclosure.

Referring to FIG. 1I, the UE may include a radio frequency (RF) processor 1*i*-10, a baseband processor 1*i*-20, a storage 1*i*-30, and a controller 1*i*-40. However, the disclosure is not limited to the example, and the UE may include fewer configurations or more configurations than those shown in FIG. H.

The RF processor 1*i*-10 performs functions for transmitting and receiving signals through wireless channels, e.g., band conversion and amplification of the signals. That is, the RF processor 1*i*-10 up-converts a baseband signal provided from the baseband processor 1*i*-20, into an RF band signal and then transmits the RF band signal through an antenna, and down-converts an RF band signal received through the antenna, into a baseband signal. For example, the RF processor 1*i*-10 may include a transmit filter, a receive filter, an amplifier, a mixer, an oscillator, a digital-to-analog convertor (DAC), an analog-to-digital convertor (ADC), or the like. Although only one antenna is illustrated in FIG. 1I, the UE may include a plurality of antennas. Also, the RF processor 1*i*-10 may include a plurality of RF chains. Furthermore, the RF processor 1*i*-10 may perform beamforming. For the beamforming, the RF processor 1*i*-10 may adjust phases and intensities of respective signals that are transmitted or received through a plurality of antennas or antenna elements.

The baseband processor 1*i*-20 performs conversion between a baseband signal and a bit string based on physical layer specifications of a system. For example, for data transmission, the baseband processor 1*i*-20 generates complex symbols by encoding and modulating a transmit bit string. For data reception, the baseband processor 1*i*-20 reconstructs a received bit string by demodulating and decoding a baseband signal provided from the RF processor 1*i*-10. For example, according to an OFDM scheme, for data transmission, the baseband processor 1*i*-20 generates complex symbols by encoding and modulating a transmit bit string, maps the complex symbols to subcarriers, and then configures OFDM symbols by performing inverse fast Fourier transformation (IFFT) and inserting a cyclic prefix (CP). For data reception, the baseband processor 1*i*-20 may segment a baseband signal provided from the RF processor 1*i*-10, into OFDM symbol units, may reconstruct signals mapped to subcarriers by performing fast Fourier transformation (FFT) calculation, and then may reconstruct a received bit string by demodulating and decoding the signals.

The baseband processor 1*i*-20 and the RF processor 1*i*-10 transmit and receive signals in a manner described above. Accordingly, the baseband processor 1*i*-20 and the RF processor 1*i*-10 may also be called a transmitter, a receiver, a transceiver, or a communicator. At least one of the baseband processor 1*i*-20 and the RF processor 1*i*-10 may include different communication modules to process signals of different frequency bands. The different frequency bands may include a super-high frequency (SHF) (e.g., 2.5 GHz or 5 GHz) band and a millimeter wave (mmWave) (e.g., 60 GHz) band. The UE may transmit and receive signals to and from a BS by using the baseband processor 1*i*-20 and the RF processor 1*i*-10, and the signals may include control information and data.

The storage 1*i*-30 may store basic programs, application programs, and data, e.g., configuration information, for operations of the UE. The storage 1*i*-30 may include any or a combination of storage media such as read only memory (ROM), random access memory (RAM), a hard disk, a compact disc (CD)-ROM, and a digital versatile disc (DVD). Also, the storage 1*i*-30 may include a plurality of memories. According to an embodiment of the disclosure, the storage 1*i*-30 may store a program for a method by which the UE according to the disclosure performs beam failure detection and recovery with respect to SpCell.

The controller 1*i*-40 controls overall operations of the UE. For example, the controller 1*i*-40 transmits and receives signals via the baseband processor 1*i*-20 and the RF processor 1*i*-10. Also, the controller 1*i*-40 records and reads data on or from the storage 1*i*-40. To this end, the controller 1*i*-40 may include at least one processor. For example, the controller 1*i*-40 may include a communication processor (CP) for controlling communications and an application processor (AP) for controlling an upper layer such as an application program. Also, at least one configuration in the UE may be implemented as one chip. According to an embodiment of the disclosure, the controller 1*i*-40 may include a multi-connection processor 1*i*-42 to perform processing for operations in a multi-connection mode. For example, the controller 1*i*-40 may control the UE to perform a procedure of the UE operations illustrated in FIG. 1I.

According to an embodiment of the disclosure, the UE may receive, from the BS, a configuration associated with transmission of a BFR MAC CE, and may generate and transmit a BFR MAC CE message.

Figure 1J:
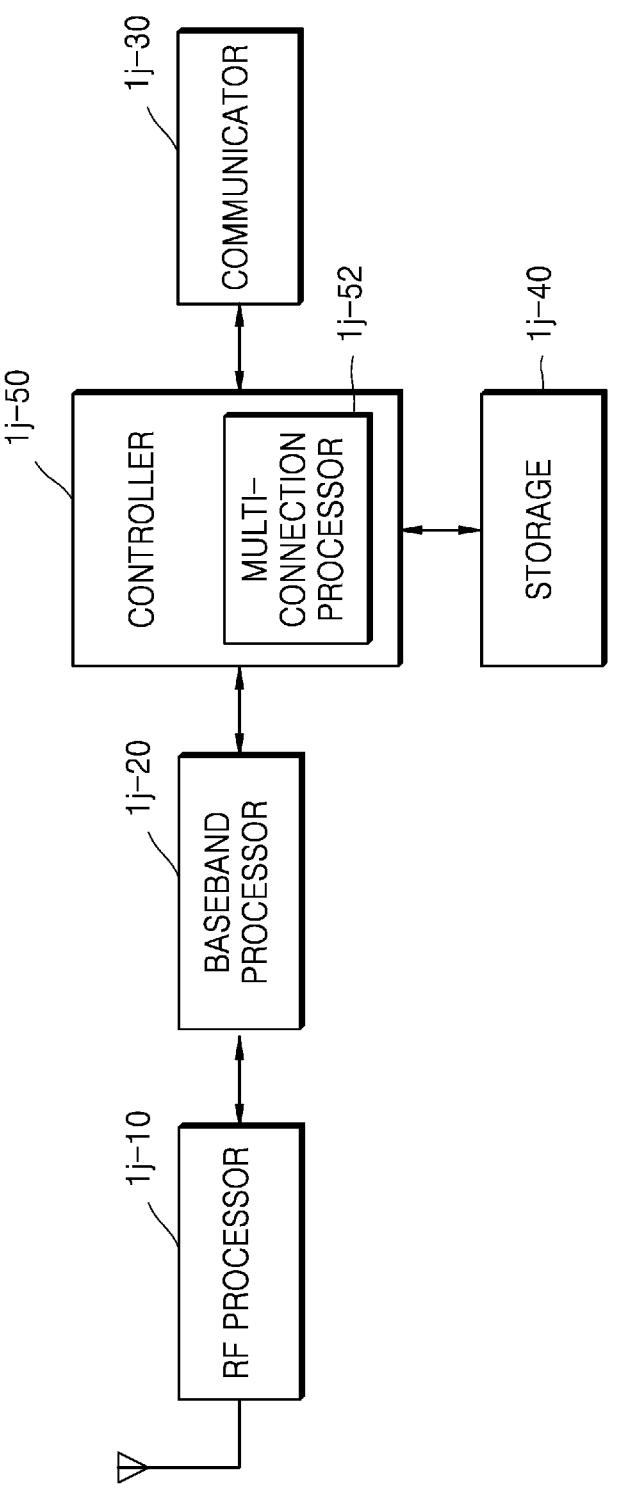
FIG. 1J is a block diagram illustrating a configuration of a BS according to an embodiment of the disclosure.

FIG. 1J is a block diagram illustrating a configuration of a BS according to an embodiment of the disclosure.

Referring to FIG. 1J, the BS may include a RF processor 1*j*-10, a baseband processor 1*j*-20, a communicator 1*j*-30, a storage 1*j*-40, and a controller 1*j*-50. However, the disclosure is not limited to the example, and the BS may include fewer configurations or more configurations than those shown in FIG. 1J.

The RF processor 1*j*-10 performs functions for transmitting and receiving signals through wireless channels, e.g., band conversion and amplification of the signals. That is, the RF processor 1*j*-10 up-converts a baseband signal provided from the baseband processor 1*j*-20, into an RF band signal and then transmits the RF band signal through an antenna, and down-converts an RF band signal received through the antenna, into a baseband signal. For example, the RF processor 1*j*-10 may include a transmit filter, a receive filter, an amplifier, a mixer, an oscillator, a DAC, an ADC, or the like. Although only one antenna is illustrated in FIG. 1J, the RF processor 1*j*-10 may include a plurality of antennas. Also, the RF processor 1*j*-10 may include a plurality of RF chains. Furthermore, the RF processor 1*j*-10 may perform beamforming. For the beamforming, the RF processor 1*j*-10 may adjust phases and intensities of respective signals that are transmitted or received through a plurality of antennas or antenna elements. The RF processor 1*j*-10 may perform a DL MIMO operation by transmitting one or more layers.

The baseband processor 1*j*-20 may convert between a baseband signal and a bit string according to physical layer specifications of a preset radio access technology. For example, for data transmission, the baseband processor 1*j*-20 may generate complex symbols by encoding and modulating a transmit bit string. For data reception, the baseband processor 1*j*-20 may reconstruct a received bit string by demodulating and decoding a baseband signal provided from the RF processor 1*j*-10. For example, according to an OFDM scheme, for data transmission, the baseband processor 1*j*-20 may generate complex symbols by encoding and modulating a transmit bit string, may map the complex symbols to subcarriers, and then may configure OFDM symbols by performing IFFT and inserting a cyclic prefix (CP). For data reception, the baseband processor 1*j*-20 may segment a baseband signal provided from the RF processor 1*j*-10, into OFDM symbol units, may reconstruct signals mapped to subcarriers by performing FFT calculation, and then may reconstruct a received bit string by demodulating and decoding the signals. The baseband processor 1*j*-20 and the RF processor 1*j*-10 may transmit and receive signals in a manner described above. Accordingly, the baseband processor 1*j*-20 and the RF processor 1*j*-10 may also be called a transmitter, a receiver, a transceiver, or a communicator. The BS may transmit and receive signals to and from a UE by using the baseband processor 1*j*-20 and the RF processor 1*j*-10, and the signals may include control information and data.

The communicator 1*j*-30 may provide an interface for performing communication with other nodes in a network. That is, the communicator 1*j*-30 converts a bit string into a physical signal, the bit string being transmitted from a primary BS to another node, e.g., an auxiliary BS, a core network, etc., and converts a physical signal into a bit string, the physical signal being received from the other node. The communicator 1*j*-30 may include a backhaul communicator.

The storage 1*j*-40 stores basic programs, application programs, and data, e.g., configuration information, for operations of the BS. The storage 1*j*-40 may store information about a bearer allocated to the accessing UE, a measurement result reported from the accessing UE, and the like. Also, the storage 1*j*-40 may store information that is a reference as to whether to provide or stop multi-connection to the UE. The storage 1*j*-40 provides the stored data in response to a request by the controller 1*j*-50. The storage 1*j*-40 may include any or a combination of storage media such as ROM, RAM, a hard disk, a CD-ROM, and a DVD. Also, the storage 1*j*-40 may include a plurality of memories. According to some embodiments, the storage 1*j*-40 may store a program for a method by which the BS according to the disclosure performs beam failure detection and recovery with respect to SpCell.

The controller 1*j*-50 controls overall operations of the BS. For example, the controller 1*i*-50 transmits and receives signals via the baseband processor 1*j*-20 and the RF processor 1*j*-10 or the communicator 1*j*-30. Also, the controller 1*j*-50 records and reads data on or from the storage 1*j*-40. To this end, the controller 1*j*-50 may include at least one processor. According to an embodiment of the disclosure, the controller 1*j*-50 includes a multi-connection processor 1*j*-52 to perform processing for operations in a multi-connection mode.

Also, at least one configuration in the BS may be implemented as one chip. Also, each configuration of the BS may operate to perform the afore-described embodiments of the disclosure.

The methods according to the embodiments of the disclosure as described in claims or specification may be implemented as hardware, software, or a combination of hardware and software.

When implemented as software, a computer-readable storage medium which stores one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described in the claims or the specification.

The programs (e.g., software modules or software) may be stored in non-volatile memory including RAM or flash memory, ROM, electrically erasable programmable read only memory (EEPROM), a magnetic disc storage device, a CD-ROM, a DVD, another optical storage device, or a magnetic cassette. Alternatively, the programs may be stored in memory including a combination of some or all of the above-mentioned storage media. A plurality of such memories may be included.

In addition, the programs may be stored in an attachable storage device accessible through any or a combination of communication networks such as Internet, an intranet, a local area network (LAN), a wide LAN (WLAN), a storage area network (SAN), or the like. Such a storage device may access, via an external port, a device performing the embodiments of the disclosure. Furthermore, a separate storage device on the communication network may access the electronic device performing the embodiments of the disclosure.

In the afore-described embodiments of the disclosure, elements included in the disclosure are expressed in a singular or plural form according to the embodiments of the disclosure. However, the singular or plural form is appropriately selected for convenience of descriptions and the disclosure is not limited thereto. As such, an element expressed in a plural form may also be configured as a single element, and an element expressed in a singular form may also be configured as plural elements.

Specific embodiments of the disclosure are described in the descriptions of the disclosure, but it will be understood that various modifications may be made without departing the scope of the disclosure. Thus, the scope of the disclosure is not limited to the embodiments described herein and should be defined by the appended claims and their equivalents. In other words, it will be apparent to one of ordinary skill in the art that other modifications based on the technical ideas of the disclosure are feasible. Also, the embodiments may be combined to be implemented, when required. For example, portions of the methods provided by the disclosure may be combined with each other to enable the BS and the UE to operate. Also, although the embodiments are described based on 5G and NR systems, modifications based on the technical scope of the embodiments may be applied to other communication systems such as LTE, LTE-A, LTE-A-Pro systems, or the like.

The invention claimed is:

1. A method, performed by a user equipment (UE), of performing beam failure detection and recovery, the method comprising:

receiving configuration information associated with beam failure detection and recovery;

detecting a beam failure for a special cell (SpCell) based on the configuration information, wherein the SpCell is a primary cell (PCell) of a master cell group (MCG) or a primary secondary cell (PSCell) of a secondary cell group (SCG); and transmitting, based on the detecting, a first beam failure recovery (BFR) medium access control (MAC) control element (CE) (BFR MAC CE) via a random access procedure, wherein the first BFR MAC CE comprises a one-bit field, wherein, based on the first BFR MAC CE being transmitted in the MCG, the one-bit field indicates detection of the beam failure for the PCell, and wherein, based on the first BFR MAC CE being transmitted in the SCG, the one-bit field indicates detection of the beam failure for the PSCell.

2. The method of claim 1, further comprising:

identifying, based on detecting a beam failure for a secondary cell (SCell), whether an uplink resource is available for a transmission of a second BFR MAC CE;

in case that the uplink resource is available, transmitting the second BFR MAC CE using the uplink resource; and in case that the uplink resource is not available, triggering a scheduling request (SR) for the transmission of the second BFR MAC CE.

3. The method of claim 2, wherein the transmitting of the second BFR MAC CE comprises indicating a multiplexing and assembly entity to generate the second BFR MAC CE.

4. The method of claim 1, wherein the transmitting of the first BFR MAC CE via the random access procedure comprises:

identifying, based on the random access procedure being a 4-step random access, whether a random access response reception is successful; and including, based on the random access response reception being successful, the first BFR MAC CE in a Msg3 transmission of the 4-step random access.

5. The method of claim 1, wherein the first BFR MAC CE further comprises an available candidate (AC) field for a secondary cell (SCell), and wherein the AC field for the SCell indicates whether a candidate reference signal ID field is present in the first BFR MAC CE.

6. The method of claim 1, wherein, in case that the one-bit field indicates detection of the beam failure for the SpCell, the first BFR MAC CE does not comprise an available candidate (AC) field for the SpCell.

7. The method of claim 1, wherein the configuration information comprises information indicating that the UE is configured to report the beam failure for the SpCell.

8. The method of claim 1, wherein the transmitting of the first BFR MAC CE via the random access procedure comprises:

identifying, based on the random access procedure being a 2-step random access, whether a MsgA transmission of the 2-step random access is an initial transmission; and including, based on the MsgA transmission being the initial transmission and the random access procedure being initiated for an SpCell beam failure recovery, the first BFR MAC CE in the MsgA transmission.

9. A user equipment (UE) for performing beam failure detection and recovery, the UE comprising:

a transceiver; and a processor coupled with the transceiver and configured to:

receive configuration information associated with beam failure detection and recovery, detect a beam failure for a special cell (SpCell) based on the configuration information, wherein the SpCell is a primary cell (PCell) of a master cell group (MCG) or a primary secondary cell (PSCell) of a secondary cell group (SCG), and transmit, based on the detecting, a first beam failure recovery (BFR) medium access control (MAC) control element (CE) (BFR MAC CE) via a random access procedure, wherein the first BFR MAC CE comprises a one-bit field, wherein, based on the first BFR MAC CE being transmitted in the MCG, the one-bit field indicates detection of the beam failure for the PCell, and wherein, based on the first BFR MAC CE being transmitted in the SCG, the one-bit field indicates detection of the beam failure for the PSCell.

10. The UE of claim 9, wherein the processor is further configured to:

identify, based on the random access procedure being a 4-step random access, whether a random access response reception is successful, and include, based on the random access response reception being successful, the first BFR MAC CE in a Msg3 transmission of the 4-step random access.

11. The UE of claim 9, wherein, in case that the one-bit field indicates detection of the beam failure for the SpCell, the first BFR MAC CE does not comprise an available candidate (AC) field for the SpCell.

12. The UE of claim 9, wherein the processor is further configured to:

identify, based on detecting a beam failure for a secondary cell (SCell), whether an uplink resource is available for a transmission of a second BFR MAC CE, in case that the uplink resource is available, transmit the second BFR MAC CE using the uplink resource, and in case that the uplink resource is not available, trigger a scheduling request (SR) for the transmission of the second BFR MAC CE.

13. The UE of claim 9, wherein the first BFR MAC CE further comprises an available candidate (AC) field for a secondary cell (SCell), and wherein the AC field for the SCell indicates whether a candidate reference signal ID field is present in the first BFR MAC CE.

14. The UE of claim 9, wherein the configuration information comprises information indicating that the UE is configured to report the beam failure for the SpCell.

15. The UE of claim 9, wherein the processor is further configured to:

identify, based on the random access procedure being a 2-step random access, whether a MsgA transmission of the 2-step random access is an initial transmission, and include, based on the MsgA transmission being the initial transmission and the random access procedure being initiated for an SpCell beam failure recovery, the first BFR MAC CE in the MsgA transmission.

16. A non-transitory computer-readable storage medium storing computer-executable instructions that, when executed by a processor of a user equipment (UE), cause the UE to perform operations, the operations comprising:

receiving configuration information associated with beam failure detection and recovery;

detecting a beam failure for a special cell (SpCell) based on the configuration information, wherein the SpCell is a primary cell (PCell) of a master cell group (MCG) or a primary secondary cell (PSCell) of a secondary cell group (SCG); and transmitting, based on the detecting, a first beam failure recovery (BFR) medium access control (MAC) control element (CE) (BFR MAC CE) via a random access procedure, wherein the first BFR MAC CE comprises a one-bit field, wherein, based on the first BFR MAC CE being transmitted in the MCG, the one-bit field indicates detection of the beam failure for the PCell, and wherein, based on the first BFR MAC CE being transmitted in the SCG, the one-bit field indicates detection of the beam failure for the PSCell.

17. The non-transitory computer-readable storage medium of claim 16, wherein the operations further comprise:

identifying, based on detecting a beam failure for a secondary cell (SCell), whether an uplink resource is available for a transmission of a second BFR MAC CE;

in case that the uplink resource is available, transmitting the second BFR MAC CE using the uplink resource; and in case that the uplink resource is not available, triggering a scheduling request (SR) for the transmission of the second BFR MAC CE.

18. The non-transitory computer-readable storage medium of claim 16, wherein the operations further comprise:

identifying, based on the random access procedure being a 4-step random access, whether a random access response reception is successful; and including, based on the random access response reception being successful, the first BFR MAC CE in a Msg3 transmission of the 4-step random access.

19. The non-transitory computer-readable storage medium of claim 16, wherein, in case that the one-bit field indicates detection of the beam failure for the SpCell, the first BFR MAC CE does not comprise an available candidate (AC) field for the SpCell.

20. The non-transitory computer-readable storage medium of claim 16, wherein the configuration information comprises information indicating that the UE is configured to report the beam failure for the SpCell.

21. The non-transitory computer-readable storage medium of claim 16, wherein the transmitting of the first BFR MAC CE via the random access procedure comprises:

identifying, based on the random access procedure being a 2-step random access, whether a MsgA transmission of the 2-step random access is an initial transmission; and including, based on the MsgA transmission being the initial transmission and the random access procedure being initiated for an SpCell beam failure recovery, the first BFR MAC CE in the MsgA transmission.

* * * * *